(12) United States Patent
Tomikawa et al.

(10) Patent No.: US 8,493,818 B2
(45) Date of Patent: Jul. 23, 2013

(54) THERMALLY-ASSISTED MAGNETIC RECORDING HEAD, HEAD GIMBAL ASSEMBLY AND MAGNETIC RECORDING DEVICE

(75) Inventors: Satoshi Tomikawa, Tokyo (JP); Tomohito Mizuno, Tokyo (JP); Katsuki Kurihara, Tokyo (JP)

(73) Assignee: TDK Corporation, Tokyo (JP)

( * ) Notice: Subject to any disclaimer, the term of this patent is extended or adjusted under 35 U.S.C. 154(b) by 202 days.

(21) Appl. No.: 13/182,562

(22) Filed: Jul. 14, 2011

(65) Prior Publication Data
US 2013/0016592 A1   Jan. 17, 2013

(51) Int. Cl.
*G11B 11/00* (2006.01)

(52) U.S. Cl.
USPC .............. 369/13.33; 369/13.13; 369/112.27

(58) Field of Classification Search
USPC .......... 369/13.33, 13.32, 13.24, 13.14, 13.03, 369/13.02, 13.12, 13.13, 13.22, 13.01, 13.35, 369/13.17, 112.27; 360/59, 125.31, 125.74, 360/125.75
See application file for complete search history.

(56) References Cited

U.S. PATENT DOCUMENTS

| 8,179,628 B2* | 5/2012 | Zhou et al. ..................... 360/59 |
| 8,315,129 B1* | 11/2012 | Komura et al. ............. 369/13.33 |
| 8,369,192 B1* | 2/2013 | Komura et al. ............. 369/13.33 |
| 8,374,060 B2* | 2/2013 | Shimazawa et al. ........ 369/13.01 |
| 8,400,885 B2* | 3/2013 | Miyauchi et al. ........... 369/13.17 |

FOREIGN PATENT DOCUMENTS

| JP | A-2007-293972 | 11/2007 |
| JP | A-2010-92514 | 4/2010 |

OTHER PUBLICATIONS

U.S. Appl. No. 13/046,117, filed Mar. 11, 2011, Shimazawa.

\* cited by examiner

*Primary Examiner* — Ali Neyzari
(74) *Attorney, Agent, or Firm* — Posz Law Group, PLC

(57) ABSTRACT

A thermally-assisted magnetic recording head, includes: a pole that generates a writing magnetic field from an end surface that forms a portion of an air bearing surface opposing a magnetic recording medium; a waveguide through which light for exciting a surface plasmon propagates; a plasmon generator that couples to the light in a surface plasmon mode and generates near-field light from a near-field light generating portion on a near-field light generating end surface that forms the portion of the air bearing surface; and magnetic field focusing parts that are able to focus the writing magnetic field generated from the pole and that are disposed on both sides of the pole in a track width direction from a perspective of the air bearing surface side.

11 Claims, 12 Drawing Sheets

THERMALLY-ASSISTED MAGNETIC RECORDING HEAD, HEAD GIMBAL ASSEMBLY AND MAGNETIC RECORDING DEVICE

BACKGROUND OF THE INVENTION

1. Field of the Invention

The present invention relates to a thermally-assisted magnetic recording head that irradiates near-field light on a magnetic recording medium and records data by decreasing an anisotropic magnetic field of the magnetic recording medium and to a head gimbal assembly and a magnetic recording device to which the head is used.

2. Description of the Related Art

In the field of magnetic recording using a head and a medium, further performance improvements of thin film magnetic heads and magnetic recording media have been demanded in conjunction with a growth of high recording density of magnetic disk devices. Currently, for the thin film magnetic heads, composite type thin film magnetic heads that are configured having a configuration in which a magnetoresistive (MR) element for reading and an electromagnetic transducer element for writing are laminated are widely used.

The magnetic recording medium is a discontinuous medium in which magnetic microparticles aggregate and each of the magnetic microparticles has a single magnetic domain structure. In this magnetic recording medium, one recording bit is configured with a plurality of magnetic microparticles. Therefore, in order to increase recording density, asperities at borders between adjacent recording bits need to be reduced by decreasing the size of the magnetic microparticles. However, decreasing the size of the magnetic microparticles causes a problem in that a thermal stability of magnetizations of the magnetic microparticles is decreased along with the decrease in the volume of the magnetic microparticles.

As a countermeasure against this problem, it may be considered to increase magnetic anisotropy energy Ku of the magnetic microparticles may be considered; however, the increase in Ku causes an increase in an anisotropic magnetic field (coercive force) of the magnetic recording medium. On the other hand, an upper limit of a writing magnetic field strength for the thin film magnetic head is substantially determined by saturation magnetic flux density of a soft magnetic material configuring a magnetic core in the head. As a result, when the anisotropic magnetic field of the magnetic recording medium exceeds an acceptable value determined from the upper limit of the writing magnetic field strength, it becomes impossible to write. Currently, as a method to solve such a problem of thermal stability, a so-called thermally-assisted magnetic recording method has been proposed in which, while a magnetic recording medium formed of a magnetic material with large Ku is used, the magnetic recording medium is heated immediately before the application of the writing magnetic field so that the writing is performed with the anisotropic magnetic field being reduced.

For this thermally-assisted magnetic recording method, a method that uses a near-field light probe, a so-called plasmon generator, which is a metal piece that generates near-field light from plasmon excited by irradiated laser light, is generally known.

A magnetic recording head disposed with a conventional plasmon generator has a configuration in which a pole that generates a writing magnetic field is disposed on a trailing side with respect to a near-field light generating portion of the plasmon generator and in which a waveguide that propagates light is disposed so as to oppose the plasmon generator. This plasmon generator couples to light propagating through the waveguide in a surface plasmon mode so as to excite surface plasmon, and the surface plasmon propagates through the plasmon generator so that the near-field light is generated at the near-field light generating portion. Furthermore, under a situation where a magnetic recording medium is heated by the near-field light generated at the near-field light generating portion of the plasmon generator and the anisotropic magnetic field of the magnetic recording medium is reduced, a writing magnetic field is applied and thereby information is written.

In the magnetic recording head having such a configuration, when a distance between the near-field light generating portion that generates the near-field light in the plasmon generator and the pole that generates the writing magnetic field is large, the strength of the magnetic field applied to the magnetic recording medium with an anisotropic magnetic field reduced by the irradiation of the near-field light becomes deficient so that it becomes difficult to write information effectively. Therefore, it is considered that making the distance between the near-field light generating portion and the pole smaller by directly contacting the pole with the plasmon generator and making a thickness of the plasmon generator thinner are effectual to write information effectively. When the thickness of the plasmon generator is thinner, the peak strength of the near-field light is decreased so that a preferred thermal assist effect may not be obtained; but, on the other hand, when the thickness of the plasmon generator is thicker, the peak strength of the near-field light can be increased, but the distance between the near-field light generating portion and the pole becomes large so that it may become difficult to write information effectively.

In contrast, in the magnetic recording head having the above-described configuration, since the magnetic field continues to be applied to the magnetic recording medium that is in a cooling process after the temperature rises by the heating, the magnetic field is further applied even to the magnetic microparticles where the magnetization has not yet stabilized after the magnetic field for recording is applied. This causes the problem that sufficient signal to noise ratio (S/N ratio) cannot be obtained in the high recording density. Therefore, in order to achieve high recording density and obtain a sufficient S/N ratio, a configuration in which a magnetic field is applied prior to heating the magnetic recording medium, i.e., a configuration in which a plasmon generator in the conventional magnetic recording head is disposed on the trailing side with respect to the pole is conceivable.

An example of the above-described magnetic recording head is a magnetic recording head provided with a plasmon generator in a shape of triangular prism that protrudes in a V-shape toward a leading side (a pole side) and a pole disposed on the leading side with respect to the plasmon generator. In the magnetic recording head having this type of configuration, the plasmon generator couples to light propagating through the waveguide in the surface plasmon mode so that the surface plasmon is excited in a V-shaped protrusion portion of the plasmon generator, and the surface plasmon propagates through the V-shaped protrusion portion of the plasmon generator. Accordingly, the waveguide is disposed on the leading side of the plasmon generator, i.e., between the plasmon generator and the pole. Therefore, the distance between the near-field light generating portion in the plasmon generator and the pole becomes large, the strength of the magnetic field applied to the magnetic recording medium with an anisotropic magnetic field reduced by the irradiation of the near-field light becomes deficient, thereby it becomes difficult to write information effectively.

SUMMARY OF THE INVENTION

It is an object of the present invention to provide a thermally-assisted magnetic recording head, and a head gimbal assembly and a magnetic recording device using the thermally-assisted magnetic recording head. The thermally-assisted magnetic recording head is able to apply a magnetic field having a necessary and sufficient strength for magnetization reversal to a portion on a magnetic recording medium that is heated by irradiating near-field light even when a plasmon generator for generating the near-field light and a pole for generating a write magnetic field are separated.

In order to realize the object, a thermally-assisted magnetic recording head includes: a pole that generates a writing magnetic field from an end surface that forms a portion of an air bearing surface opposing a magnetic recording medium; a waveguide through which light for exciting a surface plasmon propagates; a plasmon generator that couples to the light in a surface plasmon mode and generates near-field light from a near-field light generating portion on a near-field light generating end surface that forms the portion of the air bearing surface; and magnetic field focusing parts that are able to focus the writing magnetic field generated from the pole and that are disposed on both sides of the pole in a track width direction from a perspective of the air bearing surface side.

In the invention above (1st invention), it is preferred that respective gaps between the magnetic field focusing parts and the waveguide in the track width direction are 375 nm or more from the perspective of the air bearing surface side (2nd invention), further it is preferred that respective gaps between the magnetic field focusing parts and the waveguide in the track width direction are in a range of 1-3 µm from the perspective of the air bearing surface side (3rd invention).

In the invention above (1st invention), the plasmon generator may be disposed on a trailing side with respect to the pole (4th invention), or the plasmon generator is disposed on a leading side with respect to the pole (5th invention).

In the invention above (4th invention), it is preferred that, from a perspective of the air bearing surface side such that the trailing side of the thermally-assisted magnetic recording head is positioned above, upper ends of the magnetic field focusing parts are positioned above an upper end of the pole (6th invention), it is also preferred that, from a perspective of the air bearing surface side such that the trailing side of the thermally-assisted magnetic recording head is positioned above, the upper ends of the magnetic field focusing parts are positioned on approximately the same height as the near-field light generating portion (7th invention).

In the invention above (4th invention), it is preferred that, the waveguide may be positioned at a location recessed from the pole along a direction perpendicular to the air bearing surface from a perspective of the air bearing surface side (8th invention), or the waveguide may be positioned between the plasmon generator and the pole.

Further, the invention provides a head gimbal assembly including the thermally-assisted magnetic recording head according to the invention above (1st invention), a suspension supporting the thermally-assisted magnetic recording head (10th invention).

Furthermore, the invention provides a magnetic recording device including the thermally-assisted magnetic recording head according to the invention above (1st invention), a positioning device that supports the thermally-assisted magnetic recording head and positions the thermally-assisted magnetic head with respect to the magnetic recording medium (11th invention).

With the present invention, it is possible to provide a thermally-assisted magnetic recording head, and a head gimbal assembly and a magnetic recording device using the thermally-assisted magnetic recording head. The thermally-assisted magnetic recording head is able to apply a magnetic field having a necessary and sufficient strength for magnetization reversal to a portion on a magnetic recording medium that is heated by irradiating near-field light even when a plasmon generator for generating the near-field light and a pole for generating a write magnetic field are separated.

DESCRIPTION OF THE PREFERRED EMBODIMENTS

Prior to explaining embodiments of the present invention, terminologies used in the present specification are defined. In a lamination structure or an element structure formed on an element formation surface of a slider substrate of a magnetic recording head according to embodiments of the present invention, from a perspective of a layer or element to be a standard, a substrate side is referred to as "lower (below)," and an opposite side is referred to as "upper (above)." In addition, in the magnetic recording head according to embodiments of the present invention, "X, Y and Z axis directions" are defined in some of the drawings as necessary. Here, the Z axis direction corresponds to the above-described "up and down directions", +Z side corresponds to a trailing side, and −Z side corresponds to a leading side. Moreover, the Y axis direction is a track width direction, and the X axis direction is a height direction A thermally-assisted magnetic recording head according to one embodiment of the present invention is explained with reference to the drawings.

Figure 1:
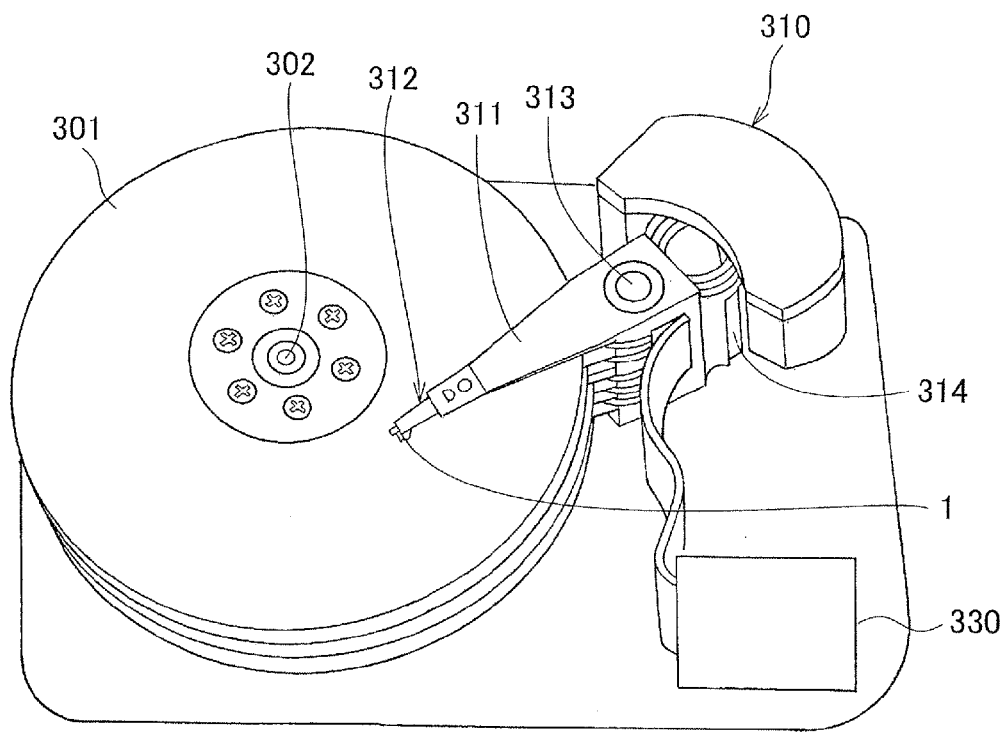
FIG. 1 is a perspective view schematically illustrating a magnetic recording device of one embodiment of the present invention.
Figure 2:
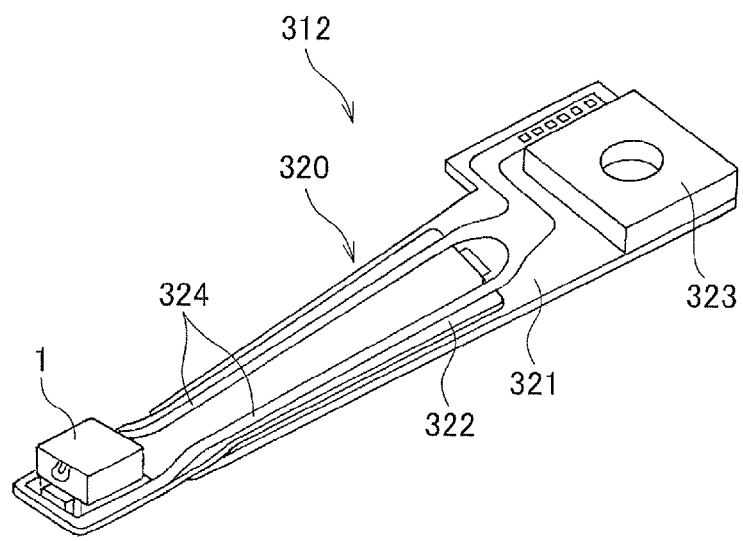
FIG. 2 is a perspective view schematically illustrating a head gimbal assembly (HGA) of one embodiment of the present invention.
Figure 3:
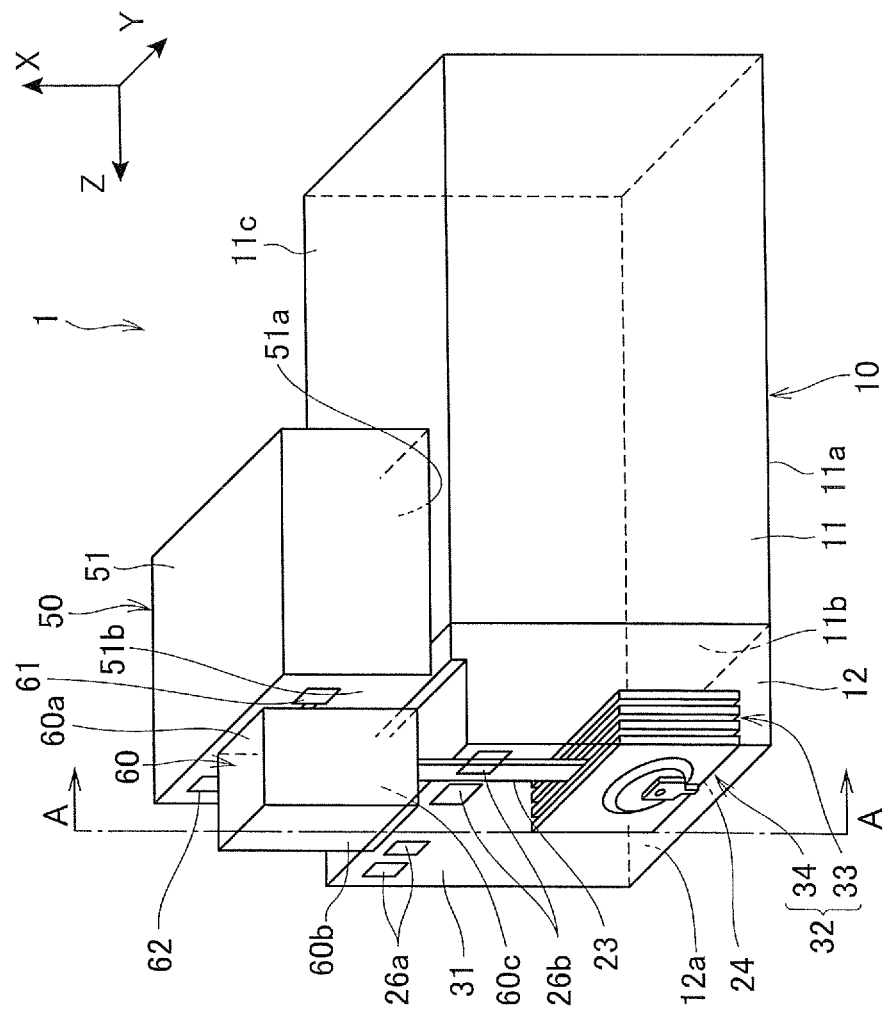
FIG. 3 is a perspective view illustrating a thermally-assisted magnetic recording head according to one embodiment of the present invention.

FIG. 1 is a perspective view schematically illustrating a magnetic recording device of the present embodiment. FIG. 2 is a perspective view schematically illustrating a head gimbal assembly (HGA) of the present embodiment. FIG. 3 is a perspective view illustrating a thermally-assisted magnetic recording head according to the present embodiment.

As illustrated in FIG. 1, a magnetic disk device as a magnetic recording device according to the present embodiment includes a plurality of magnetic disks 301, an assembly carriage device 310, head gimbal assemblies (HGA) 312 and a control circuit 330. The magnetic disks 301 rotate around a rotational shaft of a spindle motor 302. The assembly carriage device 310 is provided with a plurality of drive arms 311. The HGAs 312 each is attached to a tip portion of each of the drive arms 311 and has the thermally-assisted magnetic recording head 1, which is a thin film magnetic head, according to the present embodiment. The control circuit 330 controls writing and reading operations of the thermally-assisted magnetic recording head 1 according to the present embodiment and controls a light emission operation of a laser diode, which is a light source that generates laser light for after-mentioned thermally-assisted magnetic recording.

In the present embodiment, the magnetic disks 301 are for perpendicular magnetic recording and each has a configuration in which a soft magnetic under layer, an intermediate layer and a magnetic recording layer (perpendicularly magnetized layer) are sequentially laminated on a disk substrate.

The assembly carriage device 310 is a device for positioning the thermally-assisted magnetic recording head 1 on a track, which is formed on the magnetic disk 301 and on which recording bits are arrayed. In the assembly carriage device 310, the drive arms 311 are stacked in a direction along a pivot bearing shaft 313 and are angularly swingable by a voice coil motor (VCM) 314 centering around the pivot bearing shaft 313.

The configuration of the magnetic disk device of the present embodiment is not limited to the above-described configuration but may include only a singular of the magnetic disk 301, the drive arm 311, the HGA 312 and the thermally-assisted magnetic recording head 1.

In the HGA 312 illustrated in FIG. 2, a suspension 320 includes a load beam 321, a flexure 322 that is firmly attached to the load beam 321 and has elasticity, and a base plate 323 disposed at a base of the load beam 321. In addition, a wiring member 324 formed from a lead conductor and connection pads electrically connected to both sides of the lead conductor are disposed on the flexure 322. The thermally-assisted magnetic recording head 1 according to the present embodiment is firmly attached to the flexure 322 at a tip portion of the suspension 320 so as to oppose a surface of the respective magnetic disk 301 with a predetermined space (flying height). Further, an end of the wiring member 324 is electrically connected to a terminal electrode of the thermally-assisted magnetic recording head 1 according to the present embodiment.

As illustrated in FIG. 3, the thermally-assisted magnetic recording head 1 according to the present embodiment includes a slider 10 and a light source unit 50. The slider 10, formed of ALTIC ($Al_2O_3$—TiC) or the like, is provided with a slider substrate 11 having an air bearing surface (ABS) 11a and an element formation surface 11b, and a head part 12. The ABS 11a as a medium opposing surface is processed to obtain an appropriate flying height, the element formation surface 11b is perpendicular to the ABS 11a, and the head part 12 is formed on the element formation surface 11b.

Furthermore, the light source unit 50 is formed of ALTIC ($Al_2O_3$—TiC) or the like, and is provided with a unit substrate 51 having a joining surface 51a, and a laser diode 60 as a light source disposed on a light source installation surface 51b that is perpendicular to the joining surface 51a.

Here, the slider 10 and the light source unit 50 are joined with each other in a manner of contacting a back surface 11c of the slider substrate 11 with the joining surface 51a of the unit substrate 51. The back surface 11c of the slider substrate 11 means an end surface of the slider substrate 11 on the opposite side from the ABS 11a. Note, the thermally-assisted magnetic recording head 1 according to the present embodiment may have a configuration in which the laser diode 60 is directly attached to the slider 10 without using the light source unit 50.

The head part 12 formed on the element formation surface 11b of the slider substrate 11 includes a head element 20, a waveguide 23, a plasmon generator 24, magnetic field focusing parts 25, a protective layer 31, a pair of first terminate electrodes 26a and a pair of second terminate electrodes 26b. The head element 20 has an MR element 21 for reading out data from the magnetic disk 301 and an electromagnetic transducer element 22 for writing data on the magnetic disk 301. The waveguide 23 is disposed for guiding the laser light from the laser diode 60 disposed on the light source unit 50 to an air bearing surface side. The plasmon generator 24 forms a near-field light generating optical system with the waveguide 23. The magnetic field focusing parts 25 (see FIGS. 5 and 6) are disposed for focusing a writing magnetic field generated from the electromagnetic transducer element 22 to a predetermined portion. The protective layer 31 is formed on the element formation surface 11b so as to cover the MR element 21, the electromagnetic transducer element 22, the waveguide 23, the plasmon generator 24 and the magnetic field focusing parts 25 (see FIGS. 5 and 6). The pair of first terminal electrodes 26a is exposed on an upper surface of the protective layer 31 and is electrically connected to the MR element 21. The pair of second terminal electrodes 26b is exposed on the upper surface of the protective layer 31 and is electrically connected to the electromagnetic transducer element 22. The first and second terminal electrodes 26a and 26b are electrically connected to the connection pad of the wiring member 324 disposed to the flexure 322 (see FIG. 2).

Ends of the MR element 21, the electromagnetic transducer element 22, the plasmon generator 24 and the magnetic field focusing parts 25 (see FIGS. 5 and 6) reach a head part end surface 12a, which is the air bearing surface of the head part 12. Here, the head part end surface 12a and the ABS 11a form the entire medium opposing surface of the thermally-assisted magnetic recording head 1 according to the present embodiment.

During the actual writing and reading, the thermally-assisted magnetic recording head 1 hydro-dynamically flies on the surface of the rotating magnetic disk 301 with a predetermined flying height. At this time, the end surfaces of the MR element 21 and the electromagnetic transducer element 22 oppose the surface of the magnetic recording layer of the magnetic disk 301 with an appropriate magnetic spacing. In this state, the MR element 21 performs the reading by sensing a data signal magnetic field from the magnetic recording layer, and the electromagnetic transducer element 22 performs the writing by applying a writing magnetic field to the magnetic recording layer.

At the time of the writing, the laser light that propagates from the laser diode 60 of the light source unit 50 through the waveguide 23 is coupled with the plasmon generator 24 in a surface plasmon mode and excites a surface plasmon at the plasmon generator 24. This surface plasmon propagates along the later-discussed propagation edge of the plasmon generator 24 towards the head part end surface 12a so that the near-field light is generated at the end part of the plasmon generator 24 on the head part end surface 12a side. This near-field light reaches the surface of the magnetic disk 301 so that a portion of the magnetic recording layer of the magnetic disk 301 is heated. As a result, anisotropic magnetic field (coercive force) at that portion decreases to a value at which the writing becomes possible. It becomes able to perform the thermally-assisted magnetic recording by applying a writing magnetic field to the portion where the anisotropic magnetic field has decreased.

Figure 4:
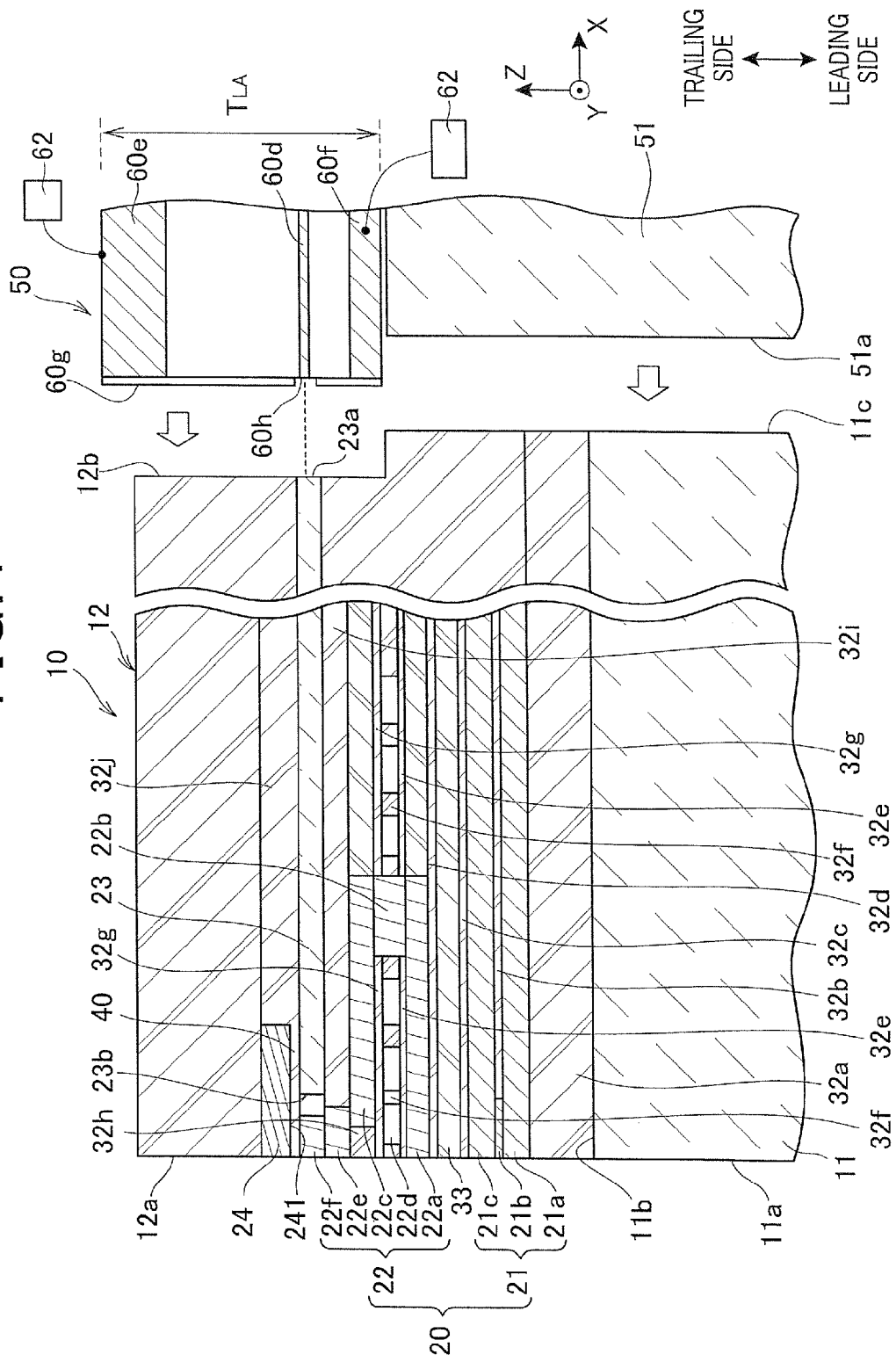
FIG. 4 is a cross-sectional view of the A-A line (XZ plane) in FIG. 3 that schematically illustrates a configuration of a main portion of the thermally-assisted magnetic recording head according to one embodiment of the present invention.

FIG. 4 is a cross-sectional view cut along the A-A line (XZ plane) in FIG. 3 that schematically illustrates a configuration of the thermally-assisted magnetic recording head 1 according to the present embodiment.

As illustrated in FIG. 4, the MR element 21 has a lower shield layer 21a formed on a first insulating layer 32a on an element forming surface 11b of the slider substrate 11, an MR multilayer body 21b formed on the lower shield layer 21a, and an upper shield layer 21c formed on the MR multilayer body 21b. A second insulating layer 32b is disposed between the lower shield layer 21a and the upper shield layer 21c in the periphery of the MR multilayer body 21b. The lower shield layer 21a and the upper shield layer 21c prevent the MR multilayer body 21b from being affected by external magnetic fields which are noise.

The lower shield layer 21b and the upper shield layer 21c are magnetic layers with a thickness of approximately 0.5-3 μm formed by, for example, a frame plating method, a spattering method or the like, and are formed by a soft magnetic material, for example, NiFe (permalloy), FeSiAl (sendust), CoFeNi, CoFe, FeN, FeZrN, CoZrTaCr or the like, or a multilayer film formed by these materials.

The MR multilayer body 21b is a magnetically sensitive portion that senses the signal magnetic field using the MR effect and may be any of a current-in-plane giant magnetoresistive (CIP-GMR) multilayer body that uses a current-in-plane giant magnetoresistive effect, a current-perpendicular-to-plane giant magnetoresistive (CPP-GMR) multilayer body that uses a current-perpendicular-to-plane giant magnetoresistive effect, and a tunnel-magnetoresistive (TMR) multilayer body that uses a tunnel magnetoresistive effect. When the MR multilayer body 21b is a CPP-GMR multilayer body or a TMR multilayer body, the lower shield layer 21a and the upper shield layer 21c function as electrodes also. On the other hand, when the MR multilayer body 21b is a CIP-GMR multilayer, insulating layers are disposed respectively between the MR multilayer body 21b and the lower shield layer 21a and between the MR multilayer body 21b and the upper shield layer 21c. Moreover, an MR lead layer that is electrically connected to the MR multilayer body 21b is disposed.

When the MR multilayer body 21b is a TMR multilayer, the MR multilayer body 21b has a structure in which the following are sequentially laminated: an antiferromagnetic layer formed of, for example, IrMn, PtMn, NiMn, RuRhMn or the like having a thickness of approximately 5-15 nm; a magnetization pinned layer that has a structure in which two ferromagnetic layers formed of CoFe or the like sandwich a nonmagnetic metal layer formed of Ru or the like and of which a magnetization direction is pinned by the antiferromagnetic layer; a tunnel barrier layer formed of a nonmagnetic dielectric material in which a metal film formed of Al, AlCu or the like having a thickness of approximately 0.5-1 nm is oxidized by oxygen introduced into a vacuum device or by natural oxidation; and a magnetization free layer that is configured with a double layer film formed by a layer of CoFe or the like having a thickness of approximately 1 nm and a layer of NiFe or the like having a thickness of approximately 3-4 nm, which are ferromagnetic materials, and that achieves tunnel exchange coupling with the magnetization pinned layer with the tunnel barrier layer therebetween.

The head part 12 in the present embodiment includes a third insulating layer 32c disposed on the upper shield layer 21c, an interelement shield layer 33 disposed on the third insulating layer 32c, and a fourth insulating layer 32d disposed on the interelement shield layer 33. The interelement shield layer 33 may be formed from a soft magnetic material, and has a function that shields the MR element 21 from the magnetic field generated at the electromagnetic transducer element 22 disposed on the fourth insulating layer 32d. The third insulating layer 32c and the interelement shield layer 33 may be omitted.

The electromagnetic transducer element 22 is for perpendicular magnetic recording, and includes a lower yoke layer 22a disposed on the fourth insulating layer 32d, a first linkage layer 22b disposed on the lower yoke layer 22a in a position away from the head part end surface 12a in the X axis direction, an upper yoke layer 22c that is disposed on the first linkage layer 22b and that does not reach the head part end surface 12a, a writing coil 22d with a spiral structure in which the writing coil 22d is wound around the first linkage layer 22b so as to pass through at least between the lower yoke layer 22a and the upper yoke layer 22c each turn, a second linkage layer 22e that is disposed on the upper yoke layer 22c and that reaches the head part end surface 12a so as to form a portion of the head part end surface 12a, and a pole 22f that is disposed on the second linkage layer 22e and that reaches the head part end surface 12a so as to form a portion of the head part end surface 12a.

The head part 12 in the present embodiment includes a fifth insulating layer 32e disposed on the lower yoke layer 22a, sixth insulating layers 32f disposed between winding lines of the writing coil 22d and in its periphery as well as in the area around the linkage layer 22b, a seventh insulating layer 32g disposed on the writing coil 22d and the sixth insulating layer 32f, a eighth insulating layer 32h disposed in the area around the upper yoke layer 22c, and a ninth insulating layer 32i disposed in the area around the second linkage layer 22e on the upper yoke layer 22c, and a $10^{th}$ insulating layer 32j disposed in an area around a plasmon generator 24 on a waveguide 23. Note, in respective areas around the lower yoke layer 22a and the upper yoke layer 22c, the insulating layers are disposed.

In the head part 12 in the present embodiment, the lower yoke layer 22a, the first linkage layer 22b, the upper yoke layer 22c and the pole 22f form a magnetic guide path that allows the magnetic flux corresponding to the magnetic field generated by the writing coil 22d to pass through, and guides the magnetic flux to the magnetic recording layer (perpendicular magnetization layer) of the magnetic disk 301. The furthest trailing side of the end surface 220 of the pole 22f that forms a portion of the head part end surface 12a is the point that generates the writing magnetic field.

The pole 22f is preferably formed from a soft magnetic material having a higher saturation magnetic flux density than the upper yoke layer 22c, and is formed from a soft magnetic material such as, for example, FeNi, FeCo, FeCoNi, FeN, FeZrN or the like, which are iron-based alloy materials having Fe as a main component. The thickness of the pole 22f in the Z axis direction can be set from 0.1 to 0.8 μm.

Furthermore, the width of the pole 22f in the Y axis direction is preferably from 0.2 to 0.4 μm. When the width of the pole 22f in the Y axis direction is within the aforementioned range, a magnetic field having a writable intensity can be appropriately applied to the heating spot of the magnetic disk 301 that is heated by the near-field light irradiated from the near-field light generating portion of the plasmon generator 24 together with the function of the magnetic field focusing parts 25 (see FIGS. 5 and 6), which are described below.

The end surface of the upper yoke layer 22c on the head part end surface 12a side does not extend to the head part end surface 12a, and is positioned at a location recessed from the head part end surface 12a by a predetermined distance toward the head part back end surface 12b side in the X axis direction. Thereby, magnetic flux can be focused at the pole 22f, and the intensity of the magnetic field generated from the pole 22f can be strengthened.

The writing coil 22d is formed from a conductive material such as Cu (copper) or the like. Note, the writing coil 22d is a single layer in the present embodiment; however, the writing coil 22d may be two or more layers or may be a helical coil arranged such that the upper yoke layer 22c is interposed therebetween. Furthermore, the number of windings of the writing coil 22d is not particularly limited, and can be set from 2 to 7 turns, for example.

The lower yoke layer 22a is formed on a forth insulating layer 32d formed of an insulation material such as $Al_2O_3$ (alumina), and functions as a waveguide that guides a magnetic flux that returns from a soft magnetic under layer disposed under the magnetic recording layer (perpendicular magnetization layer) of the magnetic disk 301. The lower yoke layer 22a is formed by a soft magnetic material and has a thickness of approximately 0.5-5 μm, for example.

The waveguide 23 is disposed at a recessed position from the pole 22f in the X axis direction (height direction) from a perspective of the ABS 11a (the head part end surface 12a). The plasmon generator 24 is disposed above the pole 22f (on the trailing side). The waveguide 23 and the plasmon generator 24 form an optical system for generating near-field light in the head part 12

The waveguide 23 is extended in parallel with the element formation surface 11b from a rear end surface 23a that forms a portion of a head part rear end surface 12b toward a rear end surface of the pole 22f with a predetermined gap between the rear end surface of the pole 22f and an end surface 23b so as not to contact the pole 22f. In addition, the upper surface (a portion of side surfaces) of the waveguide 23 and a portion of a propagation edge 241 of the plasmon generator 24 oppose each other with a predetermined gap. A part that is sandwiched between those parts forms a buffer portion 40 that has a lower refractive index than the refractive index of the waveguide 23.

The buffer portion 40 functions to couple the laser light that propagates through the waveguide 23 to the plasmon generator 24 in the surface plasmon mode. Note, the buffer portion 40 may be a part of a tenth insulating layer 32j or may be another layer disposed separately from the tenth insulating layer 32j.

On both sides of the pole 22f in the track width direction (the Y axis direction) from a perspective of the head part end surface 12a side, the magnetic field focusing parts 25 (see FIGS. 5 and 6) are disposed. The magnetic field focusing parts 25 function to focus a writing magnetic field generated from the pole 22f to a heating point heated by a near-field light irradiated from the near-field light generating portion NFP (see FIG. 6) of the plasmon generator 24. The specific structures of the pole 22f, the waveguide 23, the plasmon generator 24 and the magnetic field focusing parts 25 are described later.

As illustrated in FIG. 4, the light source unit 50 includes the unit substrate 51, the laser diode 60 disposed on the light source installation surface 51b of the unit substrate 51, a first drive terminal electrode 61 electrically connected to an electrode that forms a lower surface 60a of the laser diode 60, and a second drive terminal electrode 62 electrically connected to an electrode that forms an upper surface 60b of the laser diode 60. The first and second drive terminal electrodes 61 and 62 are electrically connected to the connection pads of the wiring member 324 (see FIG. 2) disposed at the flexure 322 (see FIG. 2). When a predetermined voltage is applied to the laser diode 60 from the first and second drive terminal electrodes 61 and 62, laser light is radiated from an emission center positioned on an emission surface 60c of the laser diode 60. In the head structure illustrated in FIG. 4, an oscillation direction of the electric field of laser light that the laser diode 60 generates is preferably perpendicular (Z axis direction) to a lamination layer surface of an active layer 60d. That is, it is preferable that the laser light that the laser diode 60 generates is a TM-mode polarized light. As a result, the laser light that propagates through the waveguide 23 becomes able to be coupled properly with the plasmon generator 24 in the surface plasmon mode through the buffer portion 40.

For the laser diode 60, InP-type, GaAs-type, and GaN-type diodes etc. may be used that are generally used for communication, optical disk storage, material analysis or the like. As long as the wavelength $\lambda_L$ for the radiated laser light is in a range of 375 nm-1.7 μm, for example, the wavelength is practical.

Specifically, an InGaAsP/InP quaternary mixed crystal type laser diode, of which the available wavelength region is considered to be 1.2-1.67 µm, for example, is also possible to be used. The laser diode 60 has a multilayer structure that includes an upper electrode 60e, the active layer 60d and a lower electrode 60f. Reflection layers for exciting the oscillation by total reflection are formed on the front and back of cleavage surfaces of this multilayer structure. In a reflection layer 60g, an aperture is disposed at a position of the active layer 60d that includes the emission center 60h. A thickness $T_{LA}$ of the laser diode 60 can be set to be approximately 60-200 µm, for example.

Also, a power source in the magnetic disk device can be used for driving the laser diode 60. In fact, magnetic disk devices normally have a power source of approximately 5V, for example, which is a sufficient voltage for operating the laser oscillation. In addition, power consumption of the laser diode 60 is approximately several tens of mW, for example, which can be sufficiently covered by the power source in the magnetic disk device. The power source applies a predetermined voltage to the first drive terminal electrode 61 that is electrically connected to the lower electrode 60f and the second drive terminal electrode 62 that is electrically connected to the upper electrode 60e, and the laser diode 60 is oscillated, so that the laser light is radiated from the aperture including the emission center 60h in the reflection layer 60g. The laser diode 60 and the first and second drive terminal electrodes 61 and 62 are not limited to the above-discussed embodiment. For example, the electrodes may be positioned in a vertically reversed manner in the laser diode 60, and the upper electrode 60e may be joined to the light source installation surface 51b of the unit substrate 51. Furthermore, it is possible to dispose a laser diode on the element formation surface 11b of the thermally-assisted magnetic recording head 1 in order to optically connect the laser diode to the waveguide 23. Moreover, when the laser diode 60 is not disposed in the thermally-assisted magnetic recording head 1, the emission center of a laser diode disposed in the magnetic disk device and the rear end surface 23a of the waveguide 23 may be connected with each other by an optical fiber or the like, for example.

The sizes of the slider 10 and the light source unit 50 may be arbitrary. For example, the slider 10 may be also a so-called femto slider having a width of 700 µm in the track width direction (Y axis direction), a length of 850 µm (in Z axis direction) and a thickness of 230 µm (in X axis direction). In this case, the size of the light source unit 50 may be one size smaller than the size of the slider and may have a width of 425 µm in the track width direction, a length of 300 µm and a thickness of 300 µm.

By connecting the above-described light source unit 50 and slider 10, the thermally-assisted magnetic recording head 1 is configured. When being connected, the joining surface 51a of the unit substrate 51 and the back surface 11c of the slider substrate 11 are contacted each other. At this time, the position of the unit substrate 51 and the slider substrate 11 are determined such that the laser light generated from the laser diode 60 enters into the rear end surface 23a of the waveguide 23 that is on a side opposite to the ABS 11a.

Figure 5:
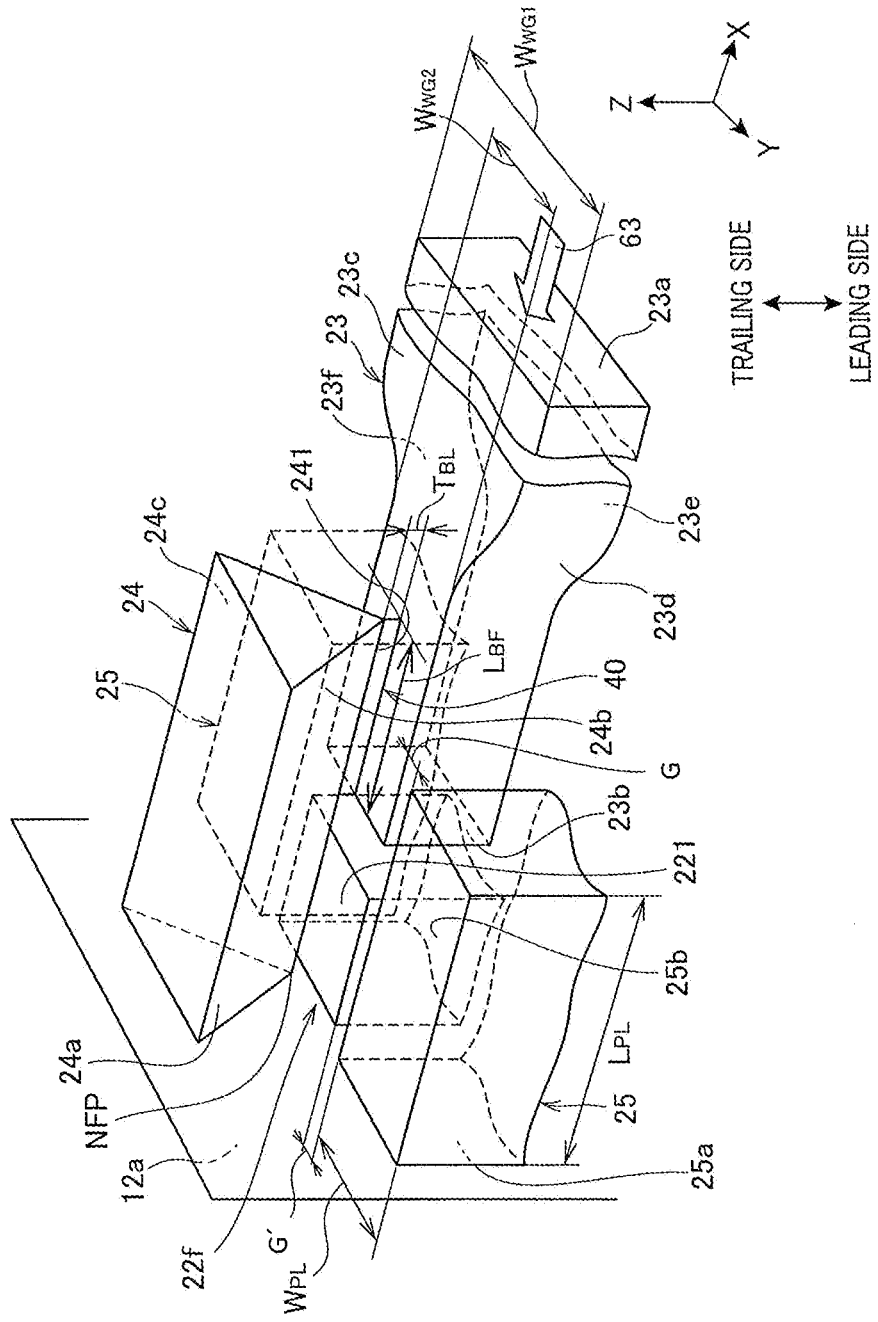
FIG. 5 is a perspective view schematically illustrating a configuration of a waveguide, a plasmon generator, a pole and a magnetic field focusing portion in the thermally-assisted magnetic recording head according to one embodiment of the present invention.

Next, a specific configuration of the waveguide 23, the plasmon generator 24, the pole 22f and the magnetic field focusing parts 25 of the thermally-assisted magnetic recording head 1 according to the present embodiment is described. FIG. 5 is a perspective view schematically illustrating a configuration of the waveguide 23, the plasmon generator 24, the pole 22f and the magnetic field focusing parts 25 of the thermally-assisted magnetic recording head 1 according to the present embodiment. In FIG. 5, the head part end surface 12a including a portion from which the writing magnetic field and the near-field light are radiated to the magnetic recording medium is positioned on the left side.

As illustrated in FIG. 5, the thermally-assisted magnetic recording head 1 according to the present embodiment includes the waveguide 23 for propagating a laser light 63 for generating a near-field light, and the plasmon generator 24 having the propagation edge 241 that propagates the surface plasmon excited by the laser light (waveguide light) 63.

Figure 6:
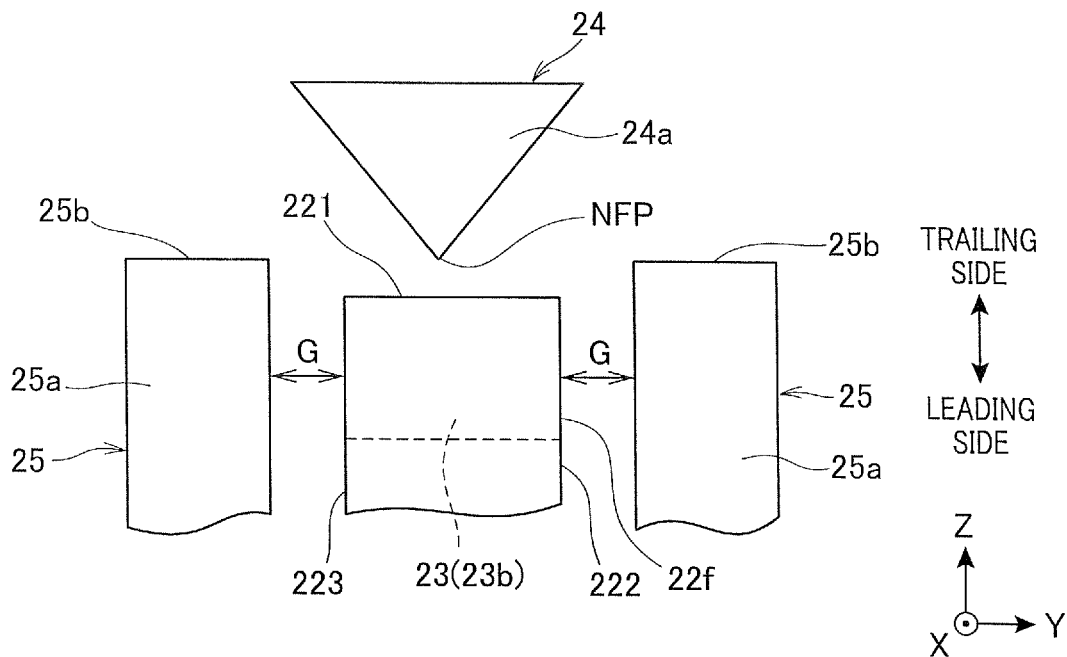
FIG. 6 is a plan view of a head part end surface and its vicinity schematically illustrating the configuration of the waveguide, the plasmon generator, the pole and the magnetic field focusing parts of the thermally-assisted magnetic recording head according to the one embodiment.

The plasmon generator 24 includes the near-field light generating end surface 24a that extends to the head part end surface 12a (see FIG. 6). In addition, the portion, sandwiched by a portion of the side surface 23c of the waveguide 23 and a portion of lower surfaces (side surfaces) 24b and 24c of the plasmon generator 24 including the propagation edge 241, forms the buffer portion 40. That is, the propagation edge 241 is covered by the buffer portion 40. This buffer portion 40 functions to couple the laser light (waveguide light) 63 to the plasmon generator 24 in the surface plasmon mode. In addition, the propagation edge 241 functions to propagate the surface plasmon excited by the laser light (waveguide light) 63 to the near-field light generating end surface 24a.

Note, in the present embodiment, side surfaces of the waveguide 23 refer end surfaces 23c-23f out of end surfaces surrounding the waveguide 23, excluding the end surface 23b and the rear end surface 23a opposite to the end surface 23b. The side surfaces of the waveguide 23 are the surfaces on which the laser light (waveguide light) 63 propagating in the waveguide 23, which corresponds to a core, may totally reflect. In the present embodiment, the side surface 23c of the waveguide 23 having a portion of which contacts the buffer portion 40 is an upper surface of the waveguide 23.

More specifically, the laser light (waveguide light) 63 that has propagated to the vicinity of the buffer portion 40 induces the surface plasmon mode at the propagation edge 241 of the plasmon generator 24 by being coupled to the optical configuration of the plasmon generator 24 formed by the waveguide 23 having a predetermined refractive index $n_{WG}$, the buffer portion 40 having a predetermined refractive index $n_{BF}$, and the plasmon generator 24 made of a conductive material such as metal or the like. That is, the laser light (waveguide light) 63 is coupled to the plasmon generator 24 in the surface plasmon mode. This induction of the surface plasmon mode becomes possible to be achieved by setting the refractive index $n_{BF}$ of the buffer portion 40 to be smaller than the refractive index $n_{WG}$ of the waveguide 23 ($n_{BF}<n_{WG}$). Actually, evanescent light is excited in the buffer portion 40 based on the optical interfacial condition between the waveguide 23, which is the core, and the buffer portion 40. Then, the surface plasmon mode is induced as the evanescent light and a fluctuation of charges excited at the surface (propagation edge 241) of the plasmon generator 24 are coupled each other, and the surface plasmon 70 is excited (see FIG. 11). Here, the propagation edge 241 is located closest to the waveguide 23 on the lower surfaces (side surfaces) 24b and 24c of the plasmon generator 24 and is angular shaped so that the electric field is more likely to be focused. As a result, the surface plasmon 70 (see FIG. 11) is more likely to be excited with this configuration.

The gap (the thickness of the buffer portion 40 immediately below the propagation edge 241) between the upper surface of the waveguide 23 (surface opposing the plasmon generator 24) and the propagation edge 241 of the plasmon generator 24 is not particularly limited as long as the surface plasmon 70 is excited on the propagation edge 241.

Respective gaps G between side surfaces 23d and 23f (side surfaces 23d and 23f of portions sandwiched by two magnetic field focusing parts 25 in the track width direction (Y axis direction)) positioned on the pole 22f side in the side surfaces 23d and 23f of the waveguide 23 and the magnetic field focusing parts 25, which will be described later, are preferably more than the wavelength $\lambda_L$ of the laser light irradiated from the laser diode 60 and entered into the waveguide 23. Specifically, the respective gaps G can be arbitrarily set depending on the wavelength $\lambda_L$ of the laser light irradiated from the laser diode 60. The respective gaps G are preferably 375 nm or more and are more preferably between 1 μm and 3 μm. As will be described later, because the magnetic field focusing parts 25 are formed of a soft magnetic material, when the respective gaps G are less than the wavelength of the laser light $\lambda_L$, the light propagating through the waveguide 23 is absorbed by the magnetic field focusing parts 25 and thereby the light peak intensity of the near-field light generated from the near-field light generating portion NFP is decreased. As a result, it may not be able to obtain the preferred thermally-assisted effect.

The plasmon generator 24 has a substantially triangular prism shape extending in the X axis direction. As is made clear in FIG. 5, a portion of the propagation edge 241 opposes the waveguide 23 with the buffer portion 40 therebetween, and extends to the near-field light generating end surface 24a. Thereby, the propagation edge 241 can realize a function of propagating the surface plasmon excited by the laser light (waveguide light) that propagates through the waveguide 23 to the near-field light generating end surface 24a. In other words, the plasmon generator 24 is coupled with the waveguide light in the surface plasmon mode, and propagates the surface plasmon on the propagation edge 241. As a result, near-field light is generated from the near-field light generating portion NFP on the near-field light generating end surface 24a.

The plasmon generator 24 is preferably formed of a conductive material such as a metal (e.g., Pd, Pt, Rh, Ir, Ru, Au, Ag, Cu or Al) or an alloy made of at least two types of these metals.

The waveguide 23 is disposed in a position recessed more than the pole 22f in the X axis direction (height direction) with a predetermined gap with the rear end surface of the pole 22f. Then, between the rear end surface of the pole 22f and the end surface 23b of the waveguide 23, a portion of the tenth insulating layer 32j may be disposed or another insulating layer other than the tenth insulating layer 32j may be also disposed. With such a configuration, the waveguide 23 and the pole 22f can be positionally separated from each other. As a result, a case can be avoided, in which the amount of light to be converted to the near-field light decreases due to a portion of the laser light (waveguide light) 63 being absorbed by the pole 22f formed by a metal.

Regarding the shape of the waveguide 23, the width in the track width direction (Y axis direction) may be constant. However, the width of a portion of the waveguide 23 in the vicinity of rear end surface of the pole 22f may be narrower in the track width direction (Y axis direction) as illustrated in FIG. 5. The width $W_{WG1}$ in the track width direction (Y axis direction) at a portion on the rear end surface 23a side that is on the opposite side to the end surface 23b of the waveguide 23 can be approximately 0.5-20 μm, for example. The width $W_{WG2}$ in the track width direction (Y axis direction) at the portion on the end surface 23b side can be approximately 0.3-10 μm, for example. The thickness $T_{WG}$ at the portion on the rear end surface 23a side (in the Z axis direction) can be approximately 0.1-4 μm, for example. The height (length) $H_{WG}$ (in the X axis direction) can be approximately 10-300 μm, for example.

The upper surface 23c and both end surfaces 23d and 23f in the track width direction (Y axis direction) of the waveguide 23, with excerption of the portion contacting the buffer portion 40, contact the tenth insulating layer 32j (see FIG. 4). The lower surface 23e of the waveguide 23 contacts the ninth insulating layer 32i (see FIG. 4). Here, the waveguide 23 is configured from a material having a refractive index $n_{WG}$ that is higher than the refractive index $n_{IS}$ of the material forming the ninth insulating layer 32i and the tenth insulating layer 32j. For example, when the wavelength $\lambda_L$ of the laser light is 600 nm, and when the ninth insulating layer 32i and the tenth insulating layer 32j are formed of $SiO_2$ (silicon dioxide; n=1.46), the waveguide 23 may be formed of $Al_2O_3$ (alumina; n=1.63). In addition, when the ninth insulating layer 32i and the tenth insulating layer 32j are formed of $Al_2O_3$ (n=1.63), the waveguide 23 may be formed of $SiO_xN_y$ (n=1.7-1.85), $Ta_2O_5$ (n=2.16), $Nb_2O_5$ (n=2.33), TiO (n=2.3-2.55) or $TiO_2$ (n=2.3-2.55). When the waveguide 23 is formed of such materials, propagation loss of the laser light (waveguide light) 63 can be maintained low due to excellent optical characteristics that the materials themselves have. Further, while the waveguide 23 functions as a core, the ninth insulating layer 32i and the tenth insulating layer 32j function as a cladding, so that the condition for total reflection off the entire side surfaces is established. As a result, more laser light (waveguide light) 63 reaches the position of the buffer portion 40, and the propagation efficiency of the waveguide 23 increases.

Further, the waveguide 23 may have a multilayer structure of dielectric materials in which layers in the upper position have the higher refractive index n. For example, such a multilayer structure may be established by sequentially laminating dielectric materials of which composition ratio of X and Y is appropriately varied when the waveguide 23 is formed of $SiO_xN_y$. The number of laminated layers may be 8-12 layers, for example. As a result, when the laser light (waveguide light) 63 is linearly polarized light in the Z axis direction, it becomes possible to propagate the laser light (waveguide light) 63 farther toward the buffer portion 40 side in the Z axis direction. At that time, by selecting the composition of each layer in the multilayer structure, the layer thickness and the number of layers, the preferred propagation position for the laser light (waveguide light) 63 in the Z axis direction can be obtained.

The buffer portion 40 is formed of a dielectric material having a refractive index $n_{BF}$ that is lower than the refractive index $n_{WG}$ of the waveguide 23. For example, when the wavelength $\lambda_L$ of the laser light is 600 nm and the waveguide 23 is formed by $Al_2O_3$ (alumina; n=1.63), the buffer portion 40 may be formed of $SiO_2$ (silicon dioxide; n=1.46). In addition, when the waveguide 23 is formed of $Ta_2O_5$ (n=2.16), the buffer portion 40 may be formed by $SiO_2$ (n=1.46) or $Al_2O_3$ (n=1.63). In these cases, the buffer portion 40 may be configured as a part of the tenth insulating layer 32j (see FIG. 4) formed of $SiO_2$ (n=1.46) or $Al_2O_3$ (n=1.63) and functioning as a cladding. Moreover, the length $L_{BF}$ (in the X axis direction) of the buffer portion 40, which is sandwiched by the side surface 23c of the waveguide 23 and the propagation edge 241, is preferably 0.5-5 μm and is preferably larger than the wavelength $\lambda_L$ of the laser light (waveguide light) 63. In this case, the buffer portion 40 has a significantly larger region compared to the so-called "focal region" formed when the laser light is focused at the buffer portion 40 and the plasmon generator 24 for being coupled in the surface plasmon mode. Therefore, coupling in the extremely stable surface plasmon mode becomes possible. The thickness $T_{BF}$ (in the Z axis direction) of the buffer portion 40 is preferably 10-200 nm.

These length $L_{BF}$ and thickness $T_{BF}$ of the buffer portion 40 are important parameters for obtaining appropriate excitation and propagation of the surface plasmon.

FIG. 6 is a plan view illustrating a shape on or near the head part end surface 12a of the waveguide 23, the plasmon generator 24, the pole 22f and the magnetic field focusing parts 25 of a thermally-assisted magnetic recording head 1 according to the present embodiment As illustrated in FIG. 6, the pole 22f extends to the head part end surface 12a. The end surface 220 on the head part end surface 12a of the pole 22f has a substantially quadrilateral shape such as a rectangle, a square, a trapezoid or the like, for example.

On the head part end surface 12a, the plasmon generator 24 has a nearly triangular shape on the leading side of which the propagation edge 241 is positioned. The near-field light generating portion NFP of the plasmon generator 24 on the head part end surface 12a can function as a light emission point of near-field light because of being positionally separated from the pole 22f. Note, the plasmon generator 24 has the nearly triangular shape, on the leading side of which the propagation edge 241 is positioned, on the head part end surface 12a in the present embodiment. However, as long as near-field light is generated, the shape is not limited to the nearly triangular shape and may be any other shape.

From a perspective of the ABS 11a (head part end surface 12a) side, the magnetic field focusing parts 25 are installed on the lower yoke layer 22a so as to sandwich the pole 22f from its both sides in the Y axis direction and each includes a end surface 25a that forms a portion of the head part end surface 12a.

The magnetic field focusing parts 25 are formed of an alloy materials including Ni, Fe or Co such as NiFe (permalloy), FeSiAl (sendust), NiFeCo, CoFe, FeN, FeZrN, CoZrTaCr or the like, or soft magnetic materials such as a multilayer film formed of these materials.

From a perspective of the ABS 11a (head part end surface 12a) side where the trailing side is located in the upper position, end surfaces (upper end surfaces) 25b of the magnetic field focusing parts 25 on the trailing side are preferably positioned upper (on trailing side) than an end surface (upper end surface) 221 of the pole 22f on the trailing side. As illustrated in FIG. 6, the end surfaces (upper end surfaces) 25b are more preferably positioned on approximately the same height as the near-field light generating portion NFP of the plasmon generator 24. As is made clear in examples, which is described below, when the upper end surfaces 25b of the magnetic field focusing parts 25 are positioned upper than the upper end surface 221 of the pole 22f, a magnetic field intensity of a writing magnetic field, which is at a portion on the magnetic recording medium heated by near-field light generated from the near-field light generating portion NFP, from the pole 22f can be increased. When the upper end surfaces 25b of the magnetic field focusing parts 25 are positioned on approximately the same height as the near-field light generating portion NFP, the magnetic field intensity can be further increased.

In the present embodiment, because the width of the pole 22f in the track width direction (Y axis direction) is the same as the width of the end surface 23b of the waveguide 23 in the track width direction (Y axis direction), respective gaps G' between the magnetic field focusing part 25 and a side surface 222 of the pole 22f and between the magnetic field focusing part 25 and a side surface 223 of the pole 22f are preferably 375 nm or more, and are more preferably 1-3 μm. When the respective gaps G' are in the above-described range, the magnetic field intensity can be increased.

Note, the widths $W_{PL}$ of the magnetic field focusing parts 25 in the Y axis direction are approximately 0.2-15.0 μm, and the lengths $L_{PL}$ (see FIG. 5) in the X axis direction are approximately 0.5-10.0 μm.

Figure 7:
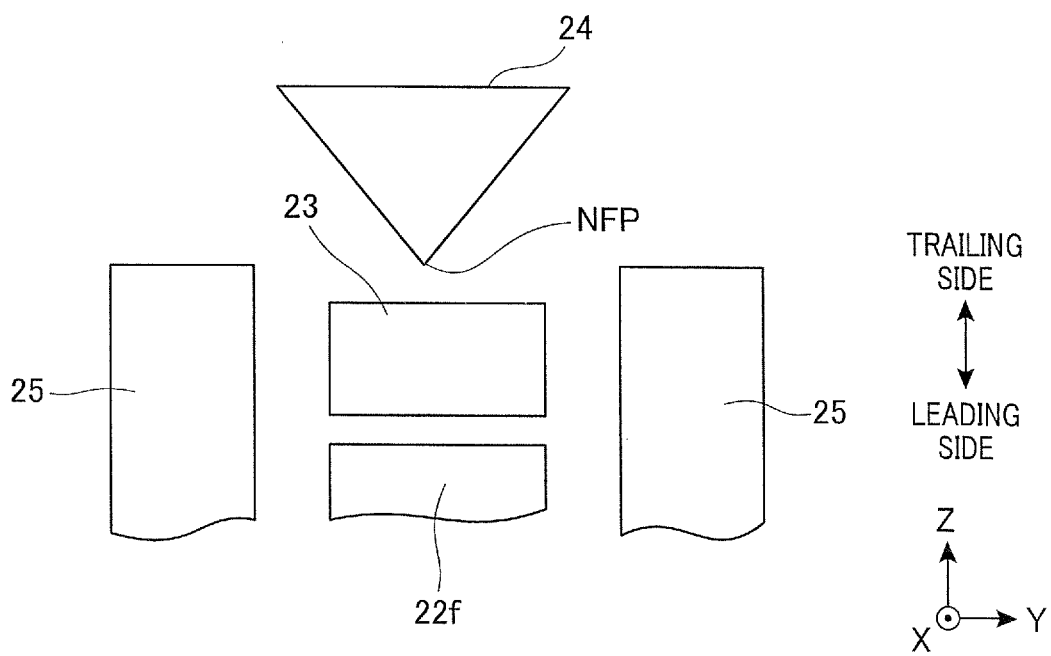
FIG. 7 is a plan view of a head part end surface and its vicinity schematically illustrating a configuration of a waveguide, a plasmon generator, a pole and magnetic field focusing parts of a thermally-assisted magnetic recording head having a first configuration example according to the one embodiment.
Figure 8:
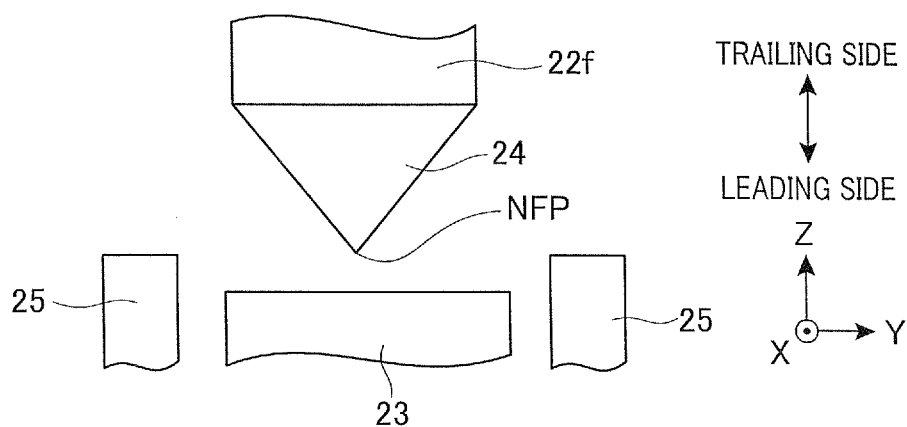
FIG. 8 is a plan view of a head part end surface and its vicinity schematically illustrating a configuration of a waveguide, a plasmon generator, a pole and magnetic field focusing parts of a thermally-assisted magnetic recording head having a second configuration example according to the one embodiment.
Figure 9:
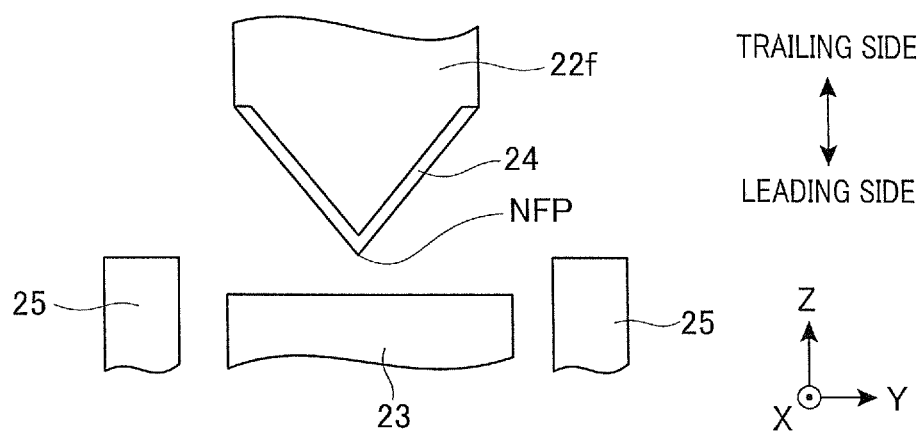
FIG. 9 is a plan view of a head part end surface and its vicinity schematically illustrating a configuration of a waveguide, a plasmon generator, a pole and magnetic field focusing parts of a thermally-assisted magnetic recording head having a third configuration example according to the one embodiment.
Figure 10:
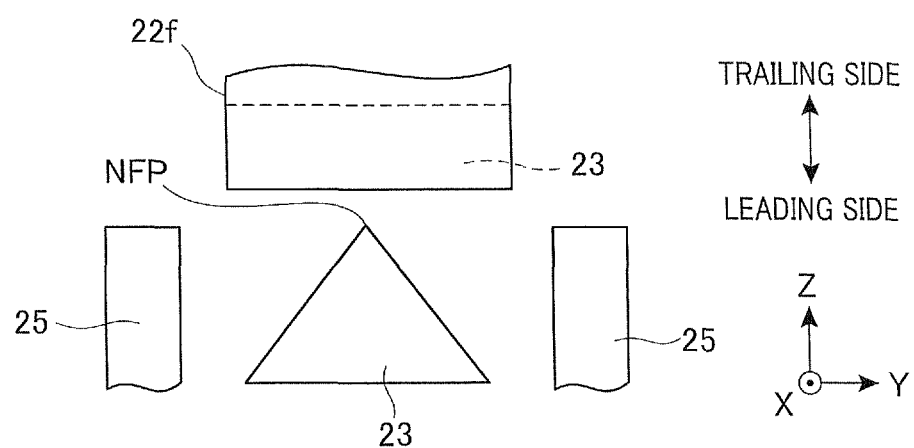
FIG. 10 is a plan view of a head part end surface and its vicinity schematically illustrating a configuration of a waveguide, a plasmon generator, a pole and magnetic field focusing parts of a thermally-assisted magnetic recording head having a fourth configuration example according to the one embodiment.

In the above-described embodiment, the waveguide 23 is disposed in the position recessed more than the pole 22f in the X axis direction (height direction) from a perspective of the ABS 11a side; but, the present invention is not limited to this configuration. As illustrated in FIG. 7, the waveguide 23 may be disposed to be positioned between the plasmon generator 24 and the pole 22f, and the end surface 23b of the waveguide 23 may be disposed to form a portion of the head part end surface 12a. Similarly, as illustrated in FIG. 8, the pole 22f may be positioned on the trailing side of the plasmon generator 24, and the waveguide 23 may be disposed on the leading side of the plasmon generator 24. Furthermore, as illustrated in FIG. 9, from a perspective of the ABS 11a side, the pole 22f may include a protrusion portion protruding toward the leading side in V-shape, the V-shaped plasmon generator 24 may be disposed to contact the protrusion portion, and the waveguide 23 may be disposed on the leading side of the plasmon generator 24. Furthermore, as illustrated in FIG. 10, from a perspective of the ABS 11a side, the plasmon generator 24 may be positioned on the leading side more than the pole 22f and may have a triangular shape protruding toward the side of the pole 22f (trailing side) in V-shape. The waveguide 23 may be disposed at a position recessed more than the pole 22f in the X axis direction (height direction) with a predetermined gap with the rear end surface of the pole 22f.

In the thermally-assisted magnetic recording head having the configuration as illustrated in FIGS. 7 and 8, the distance between the plasmon generator 24 and the pole 22f increases. However, because the magnetic field intensity at the heating point by near-field light can be increased due to the installation of the magnetic field focusing parts 25, information can be effectively written to the magnetic disk 301.

Also, in the thermally-assisted magnetic recording head having the configuration as illustrated in FIG. 9, when the thickness of the plasmon generator 24 is excessively thin, the peak intensity of near-field light decreases. Accordingly, the plasmon generator 24 needs to have a predetermined thickness; but, this increases the distance between the plasmon generator 24 (near-field light generating portion NFP) and the pole 22f. However, because the magnetic field intensity applied to the heating point can be increased due to the magnetic field focusing parts 25, a writing magnetic field having the intensity that is necessary for magnetization reversal can be applied to the magnetic disk 301.

Figure 11:
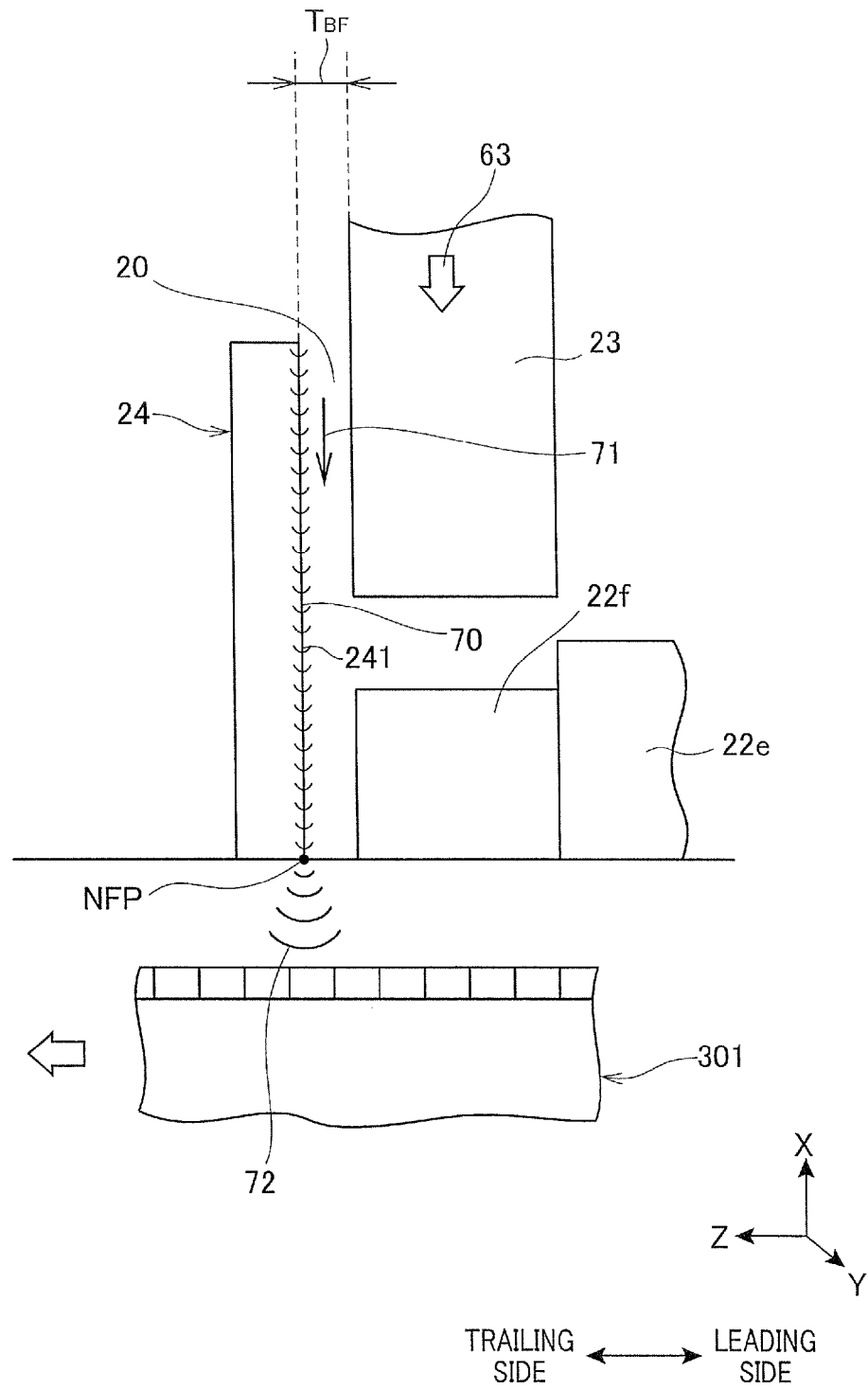
FIG. 11 is a schematic view for explaining a thermally-assisted magnetic recording that uses a surface plasmon mode of the thermally-assisted magnetic recording head according to one embodiment of the present invention.

Next, the function of the thermally-assisted magnetic recording head 1 according to the present embodiment having the above-described configuration is described. FIG. 11 is a schematic view for describing thermally-assisted magnetic recording using a surface plasmon mode in a thermally-assisted magnetic recording head 1 according to the present embodiment.

As illustrated in FIG. 11, when information is written to the magnetic recording layer of the magnetic disk 301 by the electromagnetic transducer element 22, first the laser light (waveguide light) 63 radiated from the laser diode 60 of the light source unit 50 propagates through the waveguide 23. Next, the laser light (waveguide light) 63 that has propagated to the vicinity of the buffer portion 40 couples to the optical configuration formed by the waveguide 23 having the refractive index $n_{WG}$, the buffer portion 40 having the refractive index $n_{BF}$ and the plasmon generator 24 formed of a conductive material such as a metal, and induces the surface plasmon mode on the propagation edge 241 of the plasmon generator 24. In other words, the laser light 63 is coupled with the plasmon generator 24 in the surface plasmon mode. Actually, from the optical interfacial condition between the waveguide 23, which is a core, and the buffer portion 40, evanescent light is excited into the buffer portion 40. Next, the surface plasmon mode is induced as the evanescent light and a fluctuation of charges excited at the metal surface (propagation edge 241) of the plasmon generator 24 are coupled each other, and the surface plasmon is excited. Precisely, because the surface plasmon, which is the elementary excitation in this system, is coupled with the electromagnetic wave, the excited is a surface plasmon polariton. However, the surface plasmon polariton is abbreviated and simply referred to as surface plasmon hereinafter. This surface plasmon mode can be induced when the refractive index $n_{BF}$ of the buffer portion 40 is set to be smaller than the refractive index $n_{WG}$ of the waveguide 23 ($n_{BF}<n_{WG}$) and further a length of the buffer portion 40 (in the X axis direction), that is the length $L_{BF}$ of the coupling part between the waveguide 23 and the plasmon generator 24 (length $H_{PG}$ of the plasmon generator 24 in the X axis direction), and the thickness $T_{BF}$ of the buffer portion 40 (in the Z axis direction) are properly selected.

In the induced surface plasmon mode, a surface plasmon 70 is excited on the propagation edge 241 of the plasmon generator 24 and propagates on the propagation edge 241 along the direction of arrow 71. The propagation edge 241 is not in contact with the pole 22f, and therefore is not negatively affected by the pole 22f that has not been adjusted for efficiently exciting the surface plasmon. As a result, it becomes possible that the surface plasmon intentionally propagates on the propagation edge 241.

As described above, when the surface plasmon 70 propagates in the direction of arrow 71 on the propagation edge 241, the surface plasmon 70, which is the electric field, is focused on the near-field light generating portion NFP on the near-field light generating end surface 24a, which is a destination of the propagation edge 241 that extends to the head part end surface 12a. As a result, near-field light 72 is generated from the near-field light generating portion NFP. The near-field light 72 is irradiated towards the magnetic recording layer of the magnetic disk 301, reaches the surface of the magnetic disk 301, and heats the magnetic recording layer portion of the magnetic disk 301. Therefore, an anisotropic magnetic field (coercive force) of that portion decreases to a value at which the writing can be performed, and writing is performed by the magnetic field applied to that portion.

Herein, with the present embodiment, the plasmon generator 24 is positioned closer to the trailing side than the pole 22f and therefore a portion where the writing magnetic field is applied immediately below the pole 22f moves relatively and is heated by the near-field light. Therefore, a magnetic field is not applied to the magnetic microparticles with unstable magnetization during the cooling process after the heating by the near-field light. Therefore, rapid magnetization reversal can occur in the adjacent magnetic domains on the magnetic disk 301 because of the magnetic field that was applied, and thus, the requirements for high recording density and sufficient S/N ratio can be satisfied.

Normally, the magnetic field generated from the pole 22f spreads concentrically centering around the pole 22f on the YZ plane. However, because of the installation of the magnetic field focusing parts 25, the magnetic field generated from the pole 22f does not spread on the YZ plane so that the magnetic field is focused on the portion where the magnetic field should be applied to achieve the writing of data to the magnetic disk 301. Therefore, the writing magnetic field having the intensity that is necessary for the magnetization reversal is applied to the magnetic disk 301.

Moreover, heat generation due to the generation of near-field light 72 occurs in the vicinity of the near-field light generating portion NFP of the near-field light generating end surface 24a. However, because the plasmon generator 24 and the pole 22f are positionally separated, the heat can be suppressed from escaping to the pole 22f side. Therefore, degradation and the like of the pole 22f due to the heat that escapes to the pole 22f side can also be suppressed.

Furthermore, when the respective gaps between the side surfaces 23d and 23f of the waveguide 23 and the magnetic field focusing parts 25 have the length of no less than the wavelength $\lambda_L$ of the laser light entering into the waveguide 23, a decay of the light propagating through the waveguide 23 is suppressed so that the preferred thermally-assisted effect can be obtained.

The thermally-assisted magnetic recording head with the above-described configuration can be manufactured as described below.

FIGS. 12A-12E are schematic views illustrating steps for forming the plasmon generator 24 of the thermally-assisted magnetic recording head 1 according to the present embodiment. All of the drawings (FIGS. 12A-12D) are plan views illustrating a YZ plane from a perspective of the air bearing surface side.

Figure 12A:
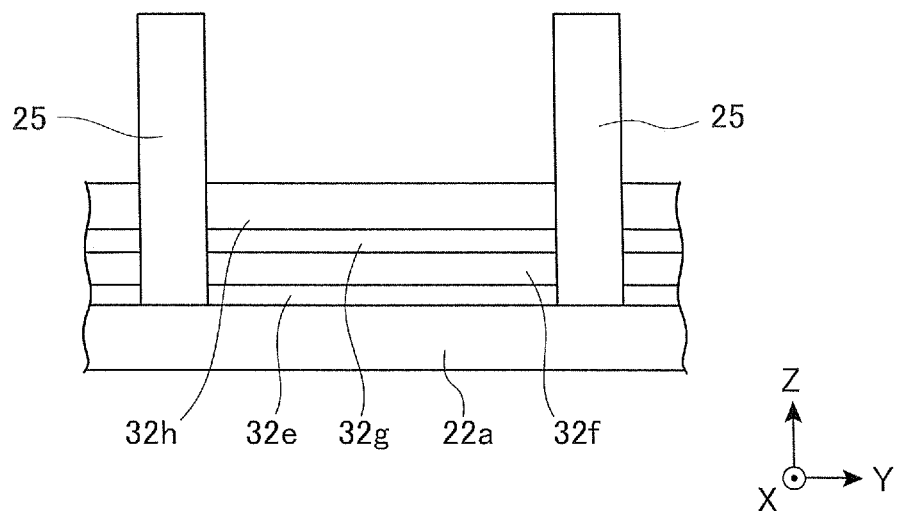
FIGS. 12A-12D are schematic views illustrating processes of forming an electromagnetic transducer element, a waveguide, a magnetic field focusing portion and a plasmon generator in the thermally-assisted magnetic recording head according to one embodiment of the present invention.

As illustrated in FIG. 12A, the fifth insulating layer 32e formed of $Al_2O_3$ or the like is formed so as to cover the lower yoke layer 22a formed of a magnetic material such as FeCo or the like and planarized using a polishing method such as chemical mechanical polishing (CMP). Two opening parts where the lower yoke layer 22a is exposed are formed by a dry etching method such as an ion milling or the like. Then, the magnetic field focusing parts 25 formed of a soft magnetic material such as NiFe or the like are formed in the two opening parts by a plating method or the like.

Next, while the writing coil 22d winding around the first linkage layer 22b is formed, the sixth insulating layers 32f are formed between the windings of the writing coil 22d. Further, the seventh insulating layer 32g made of $Al_2O_3$ or the like is formed, and then the eighth insulating layer 32h is formed and planarized using a polishing method such as chemical mechanical polishing (CMP).

Figure 12B:
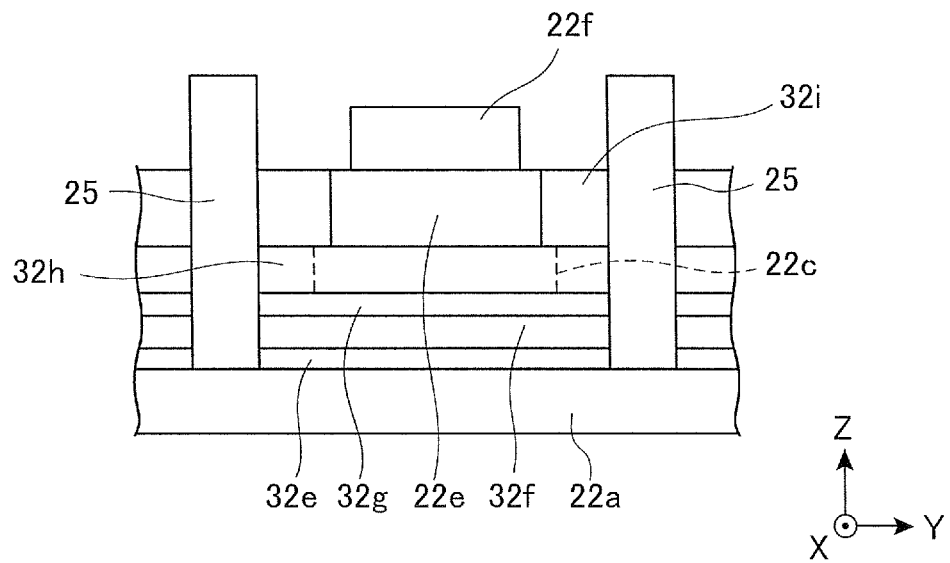

Next, as illustrated in FIG. 12B, an opening part is formed on the eighth insulating layer 32h by a dry etching method such as an ion milling or the like. After the upper yoke layer 22c, the second linkage layer 22e and the pole 22f are formed by, for example, a plating method or the like in the opening part, the ninth insulating layer 32i is formed, and the waveguide 23 formed of, for example, TaOx or the like is formed by a sputtering or the like on the ninth insulating layer 32i.

Figure 12C:
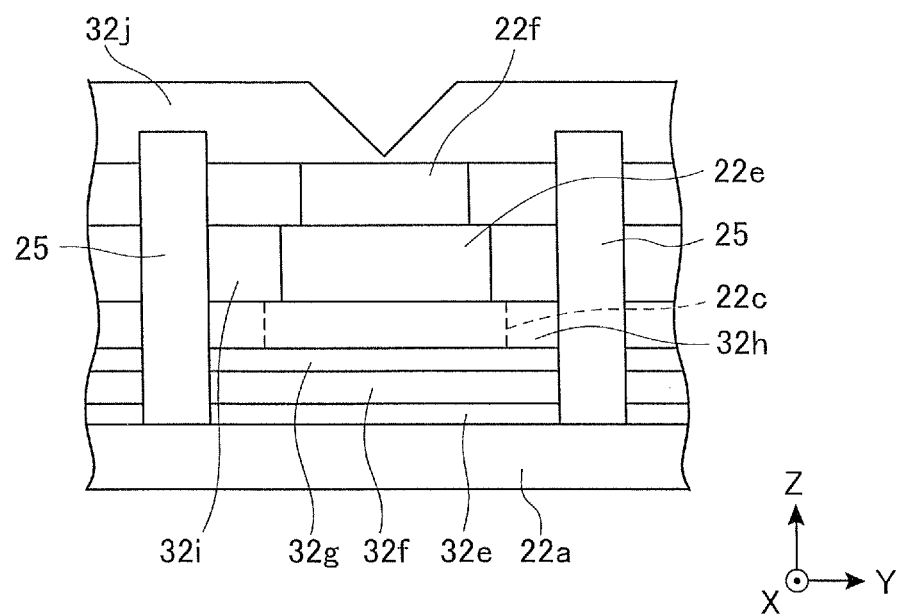

Next, as illustrated in FIG. 12C, the tenth insulating layer 32j is formed so as to cover the pole 22f and the waveguide 23. A groove having a nearly V-shaped cross section is formed on the tenth insulating layer 32j by a dry etching method such as an ion milling or the like so as to have a predetermined separation between the pole 22f and the waveguide 23.

Figure 12D:
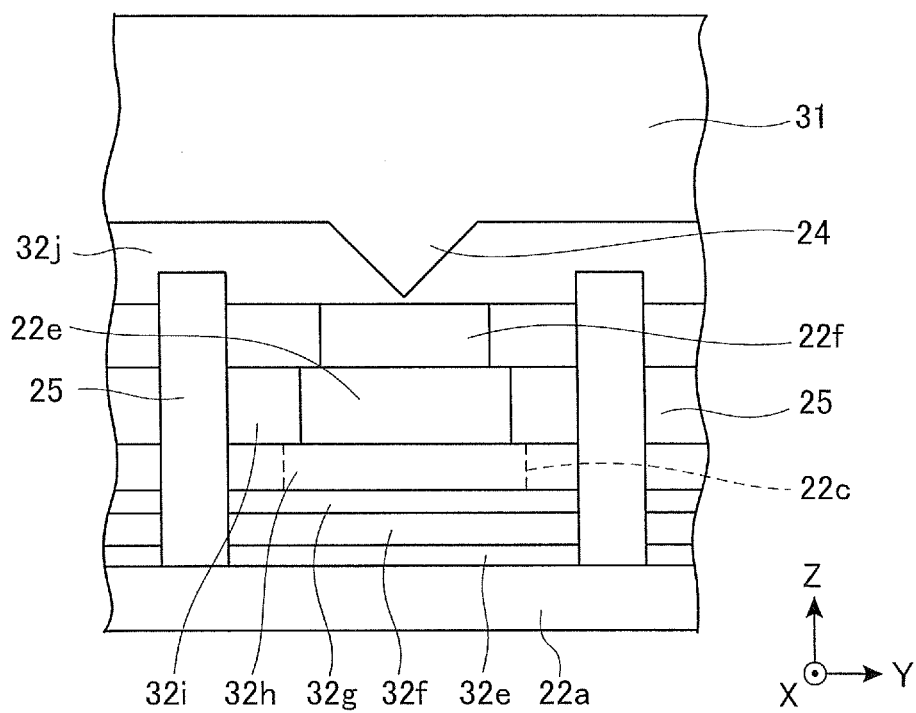

Next, as illustrated in FIG. 12D, the plasmon generator 24 made of Au or the like is formed so as to fill the formed groove. Finally, the protective layer 31 is formed and then the head part 12 according to the present embodiment is manufactured.

The above-described embodiment is disposed for a clear understanding of the present invention, and is not disposed to limit the present invention. Therefore, each of the elements disclosed in the above-described embodiment also includes any design changes and equivalents thereof that belong to the technical scope of the present invention.

EXAMPLES

The present invention is described in further detail by presenting experimental examples. However, the present invention is in no way restricted to the following experimental examples and the like.

First Experimental Example

Simulation analysis experiments were performed as described below for the relationship between the installation position of the magnetic field focusing parts 25 and the decay rate of the laser light (waveguide light) propagating through the waveguide 23 in the thermally-assisted magnetic head 1 illustrated in FIGS. 4 and 5.

The simulation analysis experiments were performed using a three-dimensional finite-difference time-domain method (FDTD method) which is electromagnetic field analysis.

In the present experimental example, a model was used in which the waveguide 23 of the thermally-assisted magnetic recording head 1 was formed of $Ta_2O_5$ (n=2.16) and the tenth insulating layer 32j contacting the side surfaces 23d and 23f of the waveguide 23 was formed of $Al_2O_3$ (n=1.63). Also, in the present model, the respective widths of the pole 22f and the waveguide 23 in the Y axis direction (track width direction) were set to be 400 nm, the respective heights of the pole 22f and the waveguide 23 in the Z axis direction were set to be 400 nm, and the height of the plasmon generator 24 in the Z axis direction was set to be 200 nm.

Then, the magnetic field focusing parts 25 (the heights of the magnetic field focusing parts 25 in the Z-axis direction: 5 μm) are installed on the lower yoke layer 22a such that the upper end surfaces 25b of the magnetic field focusing parts 25 are positioned above (on trailing side) the plasmon generator 24. The decay rate (%) of the waveguide light was calculated by the simulation analysis while the respective gaps G were varied in a predetermined range (0-2.2 μm), and the relationship between the distances G and the decay rate (%) was determined. The respective gaps G are gaps in the Y axis direction (track width direction) between the side surface 23d of the waveguide 23 and the magnetic field focusing part 25 and between the side surface 23f of the waveguide 23 and the magnetic field focusing part 25 (, which are the distances G' in the Y axis direction (track width direction) between the side surface 222 of the pole 22f and the magnetic field focusing part 25 and between the side surface 223 of the pole 22f and the magnetic field focusing part 25). In addition, the simulation analysis was performed with the laser lights, radiated from the laser diode 60, having the wavelength $\lambda_L$ of 375 nm, 800 nm and 1700 nm. Table 1 illustrates the results of the above-described simulation analysis.

TABLE 1

| | Decay-rate of waveguide light(%) | | |
|---|---|---|---|
| G' (μm) | $\lambda_L$ = 375 nm | $\lambda_L$ = 800 nm | $\lambda_L$ = 1700 nm |
| 0.0 | 100 | 100 | 100 |
| 0.1 | 63 | 80.4 | 90.8 |
| 0.2 | 34.5 | 63.0 | 81.9 |
| 0.3 | 14.5 | 47.7 | 73.6 |
| 0.4 | 3 | 34.5 | 65.7 |
| 0.5 | 0 | 23.4 | 58.2 |

TABLE 1-continued

| | Decay-rate of waveguide light(%) | | |
|---|---|---|---|
| G' (μm) | $\lambda_L$ = 375 nm | $\lambda_L$ = 800 nm | $\lambda_L$ = 1700 nm |
| 0.6 | 0 | 14.5 | 51.2 |
| 0.7 | 0 | 7.7 | 44.6 |
| 0.8 | 0 | 3.0 | 38.4 |
| 0.9 | 0 | 0.4 | 32.7 |
| 1.0 | 0 | 0.0 | 27.4 |
| 1.1 | 0 | 0.0 | 22.6 |
| 1.2 | 0 | 0.0 | 18.2 |
| 1.3 | 0 | 0.0 | 14.3 |
| 1.4 | 0 | 0.0 | 10.8 |
| 1.5 | 0 | 0.0 | 7.8 |
| 1.6 | 0 | 0.0 | 5.2 |
| 1.7 | 0 | 0.0 | 3.0 |
| 1.8 | 0 | 0.0 | 1.3 |
| 1.9 | 0 | 0 | 0 |
| 2.0 | 0 | 0 | 0 |
| 2.1 | 0 | 0 | 0 |
| 2.2 | 0 | 0 | 0 |

As illustrated in Table 1, when the respective gaps G between the side surfaces 23d and 23f of the waveguide 23 and the magnetic field focusing parts 25 are narrower than wavelength $\lambda_L$ of the laser light radiated from the laser diode 60 by disposing the magnetic field focusing parts 25 closer to the waveguide 23, it was determined that the light propagating through the waveguide 23 decayed. Therefore, it can be understood that the magnetic field focusing parts 25 are preferably installed such that the respective gaps G between the side surface 23d of the waveguide 23 and the magnetic field focusing part 25 and between the side surface 23f of the waveguide 23 and the magnetic field focusing part 25 are to have no less than the wavelength $\lambda_L$ of the light radiated from the laser diode 60 and propagating through the waveguide 23.

Second Experimental Example

Simulation analysis experiments were performed as described below for the magnetic field intensity of the magnetic field generated from the pole of the thermally-assisted magnetic recording head at a predetermined recording point.

The simulation analysis experiments were performed using a three-dimensional finite-difference time-domain method (FDTD method) which is electromagnetic field analysis.

In the thermally-assisted magnetic recording head of the present experimental example, a model was used in which the pole 22f of the thermally-assisted magnetic recording head 1 illustrated in FIGS. 4 and 5 was formed of FeCo alloy. Also, in the present model, the respective widths of the pole 22f and the waveguide 23 in the Y axis direction (track width direction) were set to be 400 nm, the respective heights of the pole 22f and the waveguide 23 in the Z axis direction were set to be 400 nm, the height of the plasmon generator 24 in the Z axis direction was set to be 200 nm, and a position that is 75 nm above from the upper end surface of the pole 22f was set to be a recording point. Furthermore, the number of windings in the writing coil 22d was 3, and the input current value was 40 mA. Note, the wavelength 4 of the laser light radiated from the laser diode 60 was set to be 800 nm.

Then, the magnetic field focusing parts 25 (the heights of the magnetic field focusing parts 25 in the Z axis direction: 5 μm) were installed on the lower yoke layer 22a such that the upper end surfaces 25b of the magnetic field focusing parts 25 were positioned above (on trailing side of) the plasmon generator 24. The magnetic field intensity (Hy) at the recording point was calculated by the simulation analysis while the respective gaps (distances) G' were varied in a predetermined range (1-3 μm), and the relationship between the respective gaps (distances) G' and the magnetic field intensity (Hy) was determined. The respective gaps (distances) G' are gaps in the Y axis direction (track width direction) between the side surface 222 of the pole 22f and the magnetic field focusing part 25 and between the side surface 223 of the pole 22f and the magnetic field focusing part 25. In addition, the simulation analysis was performed in a similar way as well for the thermally-assisted magnetic recording head that is disposed without the magnetic field focusing parts 25.

Figure 13:
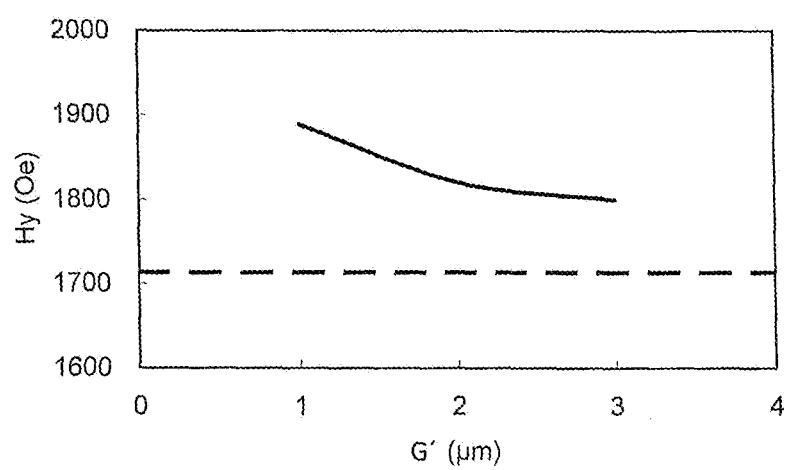
FIG. 13 is a graph illustrating the simulation analysis result in a second example.

FIG. 13 illustrates the results of the above-described simulation analysis experiments. FIG. 13 is a graph illustrating the results of the simulation analysis experiments. Note, in FIG. 13, the results of the simulation analysis experiments for the thermally-assisted magnetic recording head disposed with the magnetic field focusing parts 25 are illustrated with the solid line, and the results of the simulation analysis experiments for thermally-assisted magnetic recording head disposed without the magnetic field focusing parts 25 are illustrated with the broken line.

As illustrated in FIG. 13, it was determined that the more the magnetic field focusing parts 25 were positioned close to the pole 22f along the Y axis direction (track width direction), the more the magnetic field intensity at the recording point was able to be increased. On the other hand, when the wavelength $\lambda_L$ of the laser light radiated from the laser diode 60 is 800 nm as the present experimental example, and when the respective gaps in the Y axis direction between the magnetic field focusing parts 25 and the pole 22f are less than 1 μm, as it is clear from the results of the first experimental example, the light propagating through the waveguide 23 decays and thereby the peak intensity of the near-field light may be decreased.

Third Experimental Example

In the model used in the above-described second experimental example, the respective gaps (distances) G' in the Y axis direction between the magnetic field focusing parts 25 and the pole 22f were set to be 1 μm. Then, the magnetic field intensity at a recording point (a position of 75 nm upper (on trailing side) from the upper end part of the pole 220 was calculated by simulation analysis as in the second experimental example while the position of the upper end surfaces 25b of the magnetic field focusing parts 25 were varied in a predetermined range, and the relationship between the position of the upper end surfaces 25b of the magnetic field focusing parts 25 and the magnetic field intensity was determined. Also, simulation analysis was performed in a similar way as well for the thermally-assisted magnetic head disposed without the magnetic field focusing parts 25.

Figure 14:
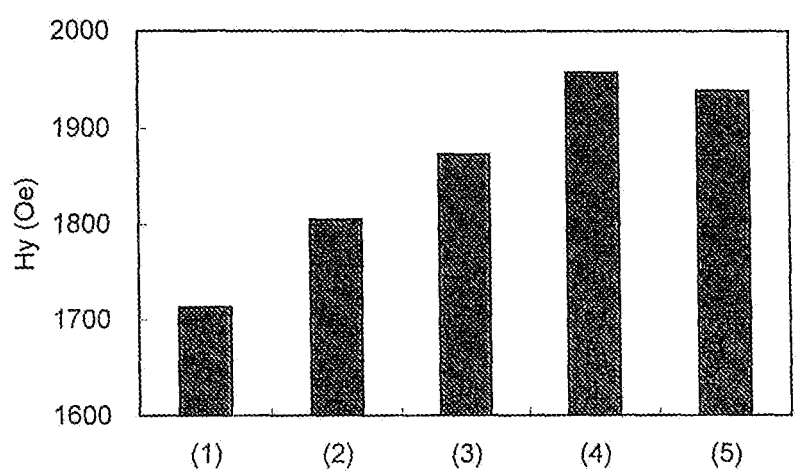
FIG. 14 is a graph illustrating the simulation analysis result in a third example.

FIG. 14 illustrates the results of the above-described simulation analysis experiments. FIG. 14 is a graph illustrating the results of the simulation analysis experiments. Note, in FIG. 14, (1) indicates the thermally-assisted magnetic recording head disposed without the magnetic field focusing parts 25, (2) indicates the thermally-assisted magnetic recording head in which the upper end surfaces 25b of the magnetic field focusing parts 25 are positioned at the same height as the lower end part (a part positioned on the most-leading side) of the second linkage layer 22e, (3) indicates the thermally-assisted magnetic recording head in which the upper end surfaces 25b of the magnetic field focusing parts 25 are positioned at the same height as the middle position of the total height of the pole 22f and the second linkage layer 22e in the Z axis direction, (4) indicates the thermally-assisted magnetic recording head in which the upper end surfaces 25b of the magnetic field focusing parts 25 are positioned at the same height as the near-field light generating portion NFP of the plasmon generator 24, and (5) indicates the thermally-assisted magnetic recording head in which the upper end surfaces 25b of the magnetic field focusing parts 25 are positioned at the same height as the upper end part (a part positioned on the most-trailing side) of the plasmon generator 24.

As illustrated in FIG. 14, it was determined that the more the upper end surfaces 25b of the magnetic field focusing parts 25 approaches the upper position (on the trailing side), the more the magnetic field intensity at the recording point was increased, also that the magnetic field intensity at the recording point was maximized by setting the upper end surfaces 25b of the magnetic field focusing parts 25 positioned at almost the same position as the near-field light generating portion NFP. On the other hand, when the upper end surfaces 25b of the magnetic field focusing parts 25 are positioned above the near-field light generating portion NFP, the magnetic field intensity decreases. Accordingly, it can be understood that the upper end surfaces 25b of the magnetic field focusing parts 25 are preferably positioned at almost the same position as the near-field light generating portion NFP.

Fourth Experimental Example

In the thermally-assisted magnetic recording head of the present experimental example, a model was used in which the pole 22f of the thermally-assisted magnetic recording head 1 illustrated in FIG. 9 was formed of FeCo alloy. Also, in the present model, the width of the pole 22f in the Y axis direction (track width direction) was set to be 400 nm, the height of the pole 22f in the Z axis direction was set to be 750 nm, the width of the waveguide 23 in the Y axis direction (track width direction) was set to be 400 nm, the height of the waveguide 23 in the Z axis direction was set to be 400 nm, the thickness of the near-field light generating portion NFP of the plasmon generator 24 in the Z axis direction was to be 35 nm, and a position of 75 nm upper from the near-field light generating portion NFP was set to be a recording point. Furthermore, the number of windings in the writing coil 22d was 3, and the input current value was set to be 40 mA. Note, the wavelength $\lambda_L$ of the laser light radiated from the laser diode 60 was set to be 800 nm.

As in the second experimental example other than using the above-described model, the magnetic field intensity at the recording point was calculated by the simulation analysis while the gap (distance) was varied in a predetermined range (1-3 μm), and the relationship between the gap (distance) and the magnetic field intensity was determined. The gap (distance) is a gap in the Y axis direction (track width direction) between the vertex of the V-shaped protrusion portion of the pole 22f (vertex positioned on the most-leading side) and the magnetic field focusing parts 25. Similarly, the simulation analysis was performed in a similar way as well for the thermally-assisted magnetic recording head that is disposed without the magnetic field focusing parts 25.

Figure 15:
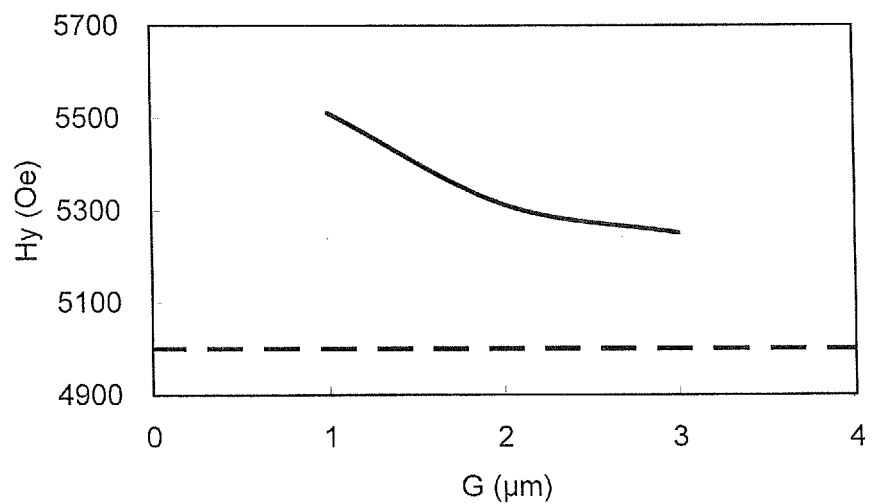
FIG. 15 is a graph illustrating the simulation analysis result in a fourth example.

FIG. 15 illustrates the results of the above-described simulation analysis experiments. FIG. 15 is a graph illustrating the results of the simulation analysis experiments. Note, in FIG. 15, the results of the simulation analysis experiments for the thermally-assisted magnetic recording head disposed with the magnetic field focusing parts 25 are illustrated with the solid line, and the results of the simulation analysis experiments for thermally-assisted magnetic recording head disposed without the magnetic field focusing parts 25 are illustrated with the broken line.

As illustrated in FIG. 15, it was determined that the more the magnetic field focusing parts 25 were positioned close to the vertex of the V-shaped protrusion portion of the pole 22f along the Y axis direction (track width direction), the more the magnetic field intensity at the recording point was able to be increased.

Fifth Experimental Example

In the model used in the above-described fourth experimental example, the gap (distance) in the Y axis direction between the magnetic field focusing parts 25 and the pole 22f were set to be 1 μm. Then, the magnetic field intensity at a recording point was calculated by simulation analysis as in the second experimental example while the position of the upper end surfaces 25b of the magnetic field focusing parts 25 were varied in a predetermined range, and the relationship between the position of the upper end surfaces 25b of the magnetic field focusing parts 25 and the magnetic field intensity was determined. Also, simulation analysis was performed in a similar way as well for the thermally-assisted magnetic head disposed without the magnetic field focusing parts 25.

Figure 16:
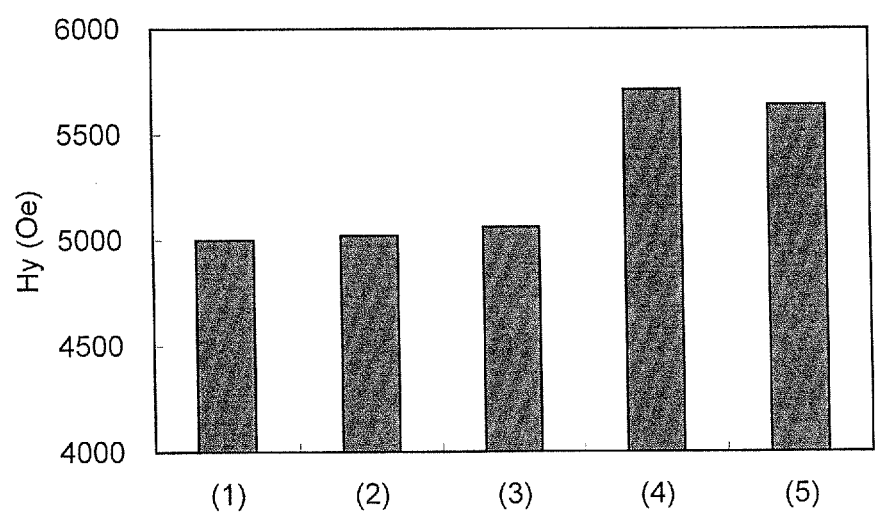
FIG. 16 is a graph illustrating the simulation analysis result in a fifth example.

FIG. 16 illustrates the results of the above-described simulation analysis experiments. FIG. 16 is a graph illustrating the results of the simulation analysis experiments. Note, in FIG. 16, (1) indicates the thermally-assisted magnetic recording head disposed without the magnetic field focusing parts 25, (2) indicates the thermally-assisted magnetic recording head in which the upper end surfaces 25b of the magnetic field focusing parts 25 are positioned at the same height as the lower end part (a part positioned on the most-leading side) of the second linkage layer 22e, (3) indicates the thermally-assisted magnetic recording head in which the upper end surfaces 25b of the magnetic field focusing parts 25 are positioned at the same height as the middle position of the total height of the pole 22f and the second linkage layer 22e in the Z axis direction, (4) indicates the thermally-assisted magnetic recording head in which the upper end surfaces 25b of the magnetic field focusing parts 25 are positioned at the same height as the near-field light generating portion NFP of the plasmon generator 24, and (5) indicates the thermally-assisted magnetic recording head in which the upper end surfaces 25b of the magnetic field focusing parts 25 are positioned at the same height as the upper end part (a part positioned on the most-trailing side) of the plasmon generator 24.

As illustrated in FIG. 16, it was determined that, the upper end surfaces 25b of the magnetic field focusing parts 25 were positioned at the upper position (on the trailing side), the more the magnetic field intensity at the recording point was increased. Also, it was determined that the magnetic field intensity at the recording point was maximized when the upper end surfaces 25b of the magnetic field focusing parts 25 are positioned at almost the same position as the near-field light generating portion NFP. On the other hand, when the upper end surfaces 25b of the magnetic field focusing parts 25 are positioned above (on the trailing side of) the near-field light generating portion NFP, the magnetic field intensity decreases. Accordingly, it can be understood that the upper end surfaces 25b of the magnetic field focusing parts 25 are preferably positioned at almost the same position as the near-field light generating portion NFP.

What is claimed is:

1. A thermally-assisted magnetic recording head, comprising:
a pole that generates a writing magnetic field from an end surface that forms a portion of an air bearing surface opposing a magnetic recording medium;
a waveguide through which light for exciting a surface plasmon propagates;
a plasmon generator that couples to the light in a surface plasmon mode and generates near-field light from a near-field light generating portion on a near-field light generating end surface that forms the portion of the air bearing surface; and
magnetic field focusing parts that are able to focus the writing magnetic field generated from the pole and that are disposed on both sides of the pole in a track width direction from a perspective of the air bearing surface side.

2. The thermally-assisted magnetic recording head according to claim 1, wherein
respective gaps between the magnetic field focusing parts and the waveguide in the track width direction are 375 nm or more from the perspective of the air bearing surface side.

3. The thermally-assisted magnetic recording head according to claim 1, wherein
respective gaps between the magnetic field focusing parts and the waveguide in the track width direction are in a range of 1-3 μm from the perspective of the air bearing surface side.

4. The thermally-assisted magnetic recording head according to claim 1, wherein
the plasmon generator is disposed on a trailing side with respect to the pole.

5. The thermally-assisted magnetic recording head according to claim 1, wherein
the plasmon generator is disposed on a leading side with respect to the pole.

6. The thermally-assisted magnetic recording head according to claim 4, wherein
from a perspective of the air bearing surface side such that the trailing side of the thermally-assisted magnetic recording head is positioned above,
upper ends of the magnetic field focusing parts are positioned above an upper end of the pole.

7. The thermally-assisted magnetic recording head according to claim 4, wherein
from a perspective of the air bearing surface side such that the trailing side of the thermally-assisted magnetic recording head is positioned above,
the upper ends of the magnetic field focusing parts are positioned on approximately the same height as the near-field light generating portion.

8. The thermally-assisted magnetic recording head according to claim 4, wherein
the waveguide is positioned at a location recessed from the pole along a direction perpendicular to the air bearing surface from a perspective of the air bearing surface side.

9. The thermally-assisted magnetic recording head according to claim 4, wherein
the waveguide is positioned between the plasmon generator and the pole.

10. A head gimbal assembly, comprising:
the thermally-assisted magnetic recording head according to claim 1; and
a suspension supporting the thermally-assisted magnetic recording head.

11. A magnetic recording device, comprising:
the thermally-assisted magnetic recording head according to claim 1;
a positioning device that supports the thermally-assisted magnetic recording head and positions the thermally-assisted magnetic head with respect to the magnetic recording medium.

\* \* \* \* \*